United States Patent
Chang

(10) Patent No.: US 6,782,906 B2
(45) Date of Patent: Aug. 31, 2004

(54) TIME BASED MASS FLOW CONTROLLER AND METHOD FOR CONTROLLING FLOW RATE USING IT

(76) Inventor: Young-Chul Chang, Taeyoung-Wolbong, Apt. 103-1302 Ssangyong-Dong, 330-090 Chunan-Si, Choongchungnam-Do (KR)

( * ) Notice: Subject to any disclaimer, the term of this patent is extended or adjusted under 35 U.S.C. 154(b) by 326 days.

(21) Appl. No.: 10/112,692

(22) Filed: Mar. 29, 2002

(65) Prior Publication Data

US 2003/0183279 A1 Oct. 2, 2003

Related U.S. Application Data

(63) Continuation-in-part of application No. 10/049,197, filed on Feb. 5, 2002, now abandoned.

(51) Int. Cl.[7] ................................................. G05D 7/06
(52) U.S. Cl. ....................... 137/10; 137/486; 137/487.5
(58) Field of Search ........................ 137/487.5, 1, 486, 137/10

(56) References Cited

U.S. PATENT DOCUMENTS

| 5,720,415 A | 2/1998 | Morningstar | |
|---|---|---|---|
| 6,543,466 B2 * | 4/2003 | Gill | 137/10 |
| 6,712,084 B2 * | 3/2004 | Shajii et al. | 137/487.5 |

FOREIGN PATENT DOCUMENTS

| JP | 09222344 | 8/1997 | |
|---|---|---|---|
| JP | 11094603 | 4/1999 | |
| WO | WO 02/054020 | * 7/2002 | 137/487.5 |

* cited by examiner

Primary Examiner—Kevin Lee
(74) Attorney, Agent, or Firm—F. Chau & Associates, LLC

(57) ABSTRACT

A time based mass flow controller controls the volume flow and mass flow accurately based on time. The time based mass flow controller includes at least one reservoir 1, at least one inlet valve 13, each inlet valve 13 opening/closing an inlet of a corresponding reservoir 1, at least one outlet valve 3, each outlet valve 3 opening/closing an outlet of a corresponding reservoir 1, at least one pressure sensor, each pressure sensor detecting the gas pressure in each corresponding reservoir, and a controller for controlling the number of opening/closing loops of the inlet valve 13 and the outlet valve 3 per unit time and/or mass/volume of gas stored and discharged at the reservoir 1 per unit opening/closing loop of the inlet valve 13 and the outlet valve 3, with the inlet valve 13 opening the inlet of the reservoir 1 to allow the gas to flow into the reservoir 1 when the outlet valve 3 is in a closed state, and thereafter the outlet valve 3 opening the outlet of the reservoir 1 to allow the gas to flow out from the reservoir 1 when the inlet valve 13 is in a closed state, so that the controller may control the mass/volume flow rate of the outflow gas from the reservoir 1.

46 Claims, 18 Drawing Sheets

TIME BASED MASS FLOW CONTROLLER AND METHOD FOR CONTROLLING FLOW RATE USING IT

This is a continuation-in-part of application Ser. No. 10/049,197, filed Feb. 5, 2002 now abandoned.

TECHNICAL FIELD

This invention relates to a time based mass flow controller (MFC) and a method for controlling volume/mass flow rate accurately based on time.

BACKGROUND ART

MFCs are used in various fields such as electronic equipments, fluid equipments, etc. For instance, the manufacturing processes for semiconductor devices utilize the deposition device, the diffusion device, the etching device, the plasma device, and the sputtering device. Since each process uses different kinds of gases, all of them need to accurately and independently control the amount of gas or steam supplied. Furthermore, the remarkable size reduction of semiconductor devices through the improvement of integration techniques requires the supply gas flow rate to be controlled more accurately.

Flow rates are very difficult to measure directly. As disclosed in U.S. Pat. Nos. 6,044,701, 5,279,154 and 4,686,856 and Japanese Unexamined Patent Publication No. s59-88622, various kinds of flow controllers and meters have been suggested and used. Nevertheless, most of them are complex and expensive in installation and maintenance. Namely, the conventional MFCs are highly specialized and expensive equipments.

The conventional MFCs can be classified mainly into the thermal MFCs, which work by detecting the difference in the amount of heat transfer according to a calorimetric principle, and the pressure-based ones, which work on the relation between mass flow and pressure loss in a flow passage.

The thermal MFCs tend to have a relatively slow response time and are not accurate enough because of heat loss to the outside. Also, they require very accurate mechanical parts such as a bypass pipe and cannot be used with sensitive gases. Therefore, it isn't east to manufacture them. The pressure based MFCs require very accurately engineered components, and can suffer from 'fouling' of the flow passage such as an orifice or a nozzle.

DISCLOSURE OF INVENTION

This invention is achieved to solve the above problem. It is an object of this invention to provide a novel MFC that accurately and easily measures flow, based on a different concept from the conventional MFCs. For instance, since time can be measured more accurately than any other physical value, by using a quartz crystal timing device, this invention can easily provide accurate MFCs without an accurate implemental structure. It is another object of this invention to provide a MFC with excellent reliability, longevity, robustness, and inexpensive installation and maintenance. It is now inexpensive and easy to measure time very accurately (better than $1/10^8$ sec). Therefore, this invention is characterized in that the mass/volume flow rate can be controlled very accurately based on time. To achieve the above objects, this invention provides a time based mass flow controller comprising: at least one reservoir; at least one inlet valve, each inlet valve opening/closing an inlet of each corresponding reservoir; at least one outlet valve, each outlet valve opening/closing an outlet of each corresponding reservoir; at least one pressure sensor, each pressure sensor detecting the gas pressure in each corresponding reservoir; and a controller for controlling the number of opening/closing loops of the inlet valve and the outlet valve per unit time and/or mass/volume of a gas stored and discharged at the reservoir per unit opening/closing loop of the inlet valve and the outlet valve, with the inlet valve opening the inlet of the reservoir to allow the gas to flow into the reservoir when the outlet valve is in a closed state, and thereafter the outlet valve opening the outlet of the reservoir to allow the gas to flow out from the reservoir when the inlet valve is in a closed state, so that the controller may control the mass/volume flow rate of the outflow gas from the reservoir.

The inlet valve and the outlet valve are required to have fast acting performance at the time of their opening/closing movement, like a fast acting valve. The control of the valves can be obtained by utilizing an exclusive logic digital machine, which can control the operation of the fast acting valves based on the pressure in the reservoir.

According to a preferred embodiment of this invention, the controller controls the inlet valve to open the inlet of the reservoir when the reservoir is in a state of a reference empty pressure and to close the inlet of the reservoir in a state of a reference fill pressure, and the controller controls the outlet valve to close the outlet of the reservoir when the reservoir is in a state of the reference empty pressure and to open the outlet of the reservoir when the inlet valve is in a closed state. The controller can control a time period from an opening of the inlet of the reservoir to a closing of the inlet of the reservoir and/or from a closing of the outlet of the reservoir to a opening of the outlet of the reservoir, so that the controller may control the mass/volume flow rate of the outflow gas from the reservoir.

According to another preferred embodiment of this invention, the reservoir is a volume-variable storage chamber and the controller controls the volume of the reservoir.

For example, the reservoir takes a piston-cylinder form, and the controller controls the inlet valve to open the inlet of the reservoir when the reservoir is in a state of a reference empty pressure and to close the inlet of the reservoir when the reservoir is in a state of a reference fill pressure, and the controller controls the outlet valve to close the outlet of the reservoir when the reservoir is in a state of the reference empty pressure and to open the outlet of the reservoir when the reservoir is in a state of the reference fill pressure, and the controller controls the displacement of the piston of the reservoir to control the volume of the reservoir, so that the controller may control the mass/volume flow rate of the outflow gas from the reservoir.

According to still another preferred embodiment of this invention, the controller controls the properties, such as the temperature of the gas flowing into the inlet of the reservoir. These allow the fluid passing through the MFC to have a required characteristic.

Preferably, the time based mass flow controller further comprises a regulator on an upstream side of the inlet of the reservoir, the regulator regulating the gas pressure of an inflow gas into the reservoir to be constant. And, the time based mass flow controller further comprises a main valve on an upstream side of the inlet of the reservoir for regulating the mass/volume flow rate of an inflow gas into the reservoir, wherein the controller controls the inlet valve to open the inlet of the reservoir when the reservoir is in a state of the reference empty pressure and to close the inlet of the reservoir when the reservoir is in a state of the reference fill pressure, and the controller controls the outlet valve to close the outlet of the reservoir when the reservoir is in a state of the reference empty pressure and to open the outlet of the reservoir when the reservoir is in a state of the reference fill pressure, and the controller controls the opening level of the main valve to control the mass/volume flow rate of the inflow gas into the reservoir, so that the controller may control the mass/volume flow rate of the outflow gas from the reservoir.

According to still another preferred embodiment of this invention, a time delay is provided between a closing of the inlet valve and an opening of the outlet valve and/or between a closing of the outlet valve and an opening of the inlet valve and the controller controls the length of the time delay, so that the controller may control the mass/volume flow rate of the outflow gas from the reservoir.

According to still another preferred embodiment of this invention, the time based mass flow controller further comprises a temperature sensor for measuring the gas temperature in the reservoir, wherein the controller controls the number of opening/closing loops of the inlet valve and the outlet valve per unit time and/or mass/volume of gas stored and discharged at the reservoir per unit opening/closing loop of the inlet valve and the outlet valve, based on the gas temperature in the reservoir measured by the temperature sensor, so that the controller may control the mass/volume flow rate of the outflow gas from the reservoir.

According to still another preferred embodiment of this invention, more than one reservoir is installed in parallel and each of the inlet valves and the outlet valves of the respective reservoirs have different opening/closing points in time.

According to still another preferred embodiment of this invention, more than one reservoir is installed in parallel, and the length of the flowing line from each outlet valve to the gas user equipment could be different. And, more than one regulator can be installed in parallel, each regulator being installed on an upstream side of the inlet of each corresponding reservoir and regulating the gas pressure of an inflow gas into each corresponding reservoir to be constant. Also, more than one buffer can be installed in parallel, each buffer being installed on a downstream side of the outlet of each corresponding reservoir and having a large volume than each corresponding reservoir.

According to still another preferred embodiment of this invention, the time based mass flow controller further comprises a buffer installed on a downstream side of the outlet of the reservoir, the buffer having a larger volume than the reservoir. Preferably, the buffer has a spring means, the spring means acting against the gas pressure in the buffer. For example, the spring means has a movable wall and a spring, the movable wall having the interior face on which the gas pressure in the buffer is applied and the exterior face on which the spring acts against the gas pressure in the buffer. For another example, the spring means takes a piston form and the controller controls a displacement of the piston according to the pressure of the gas in the buffer.

Also, this invention provides a method for controlling the mass/volume flow using a time based mass flow controller, the time based mass flow controller comprising at least one reservoir, at least one inlet valve, each inlet valve opening/closing an inlet of each corresponding reservoir, at least one outlet valve, each outlet valve opening/closing an outlet of each corresponding reservoir, and at least one pressure sensor, each pressure sensor detecting the gas pressure in each corresponding reservoir, the method comprising: controlling the number of openings/closings of the inlet valve and the outlet valve per unit time and/or mass/volume of a gas stored and discharged at the reservoir per unit opening/closing loop of the inlet valve and the outlet valve, with the inlet valve opening the inlet of the reservoir to allow the gas to flow into the reservoir when the outlet valve is in a closed state, and thereafter the outlet valve opening the outlet of the reservoir to allow the gas to flow from the reservoir when the inlet valve is in a closed state, so as to control the mass/volume flow rate of the outflow gas from the reservoir.

BEST MODE FOR CARRYING OUT THE INVENTION

Figure 1:
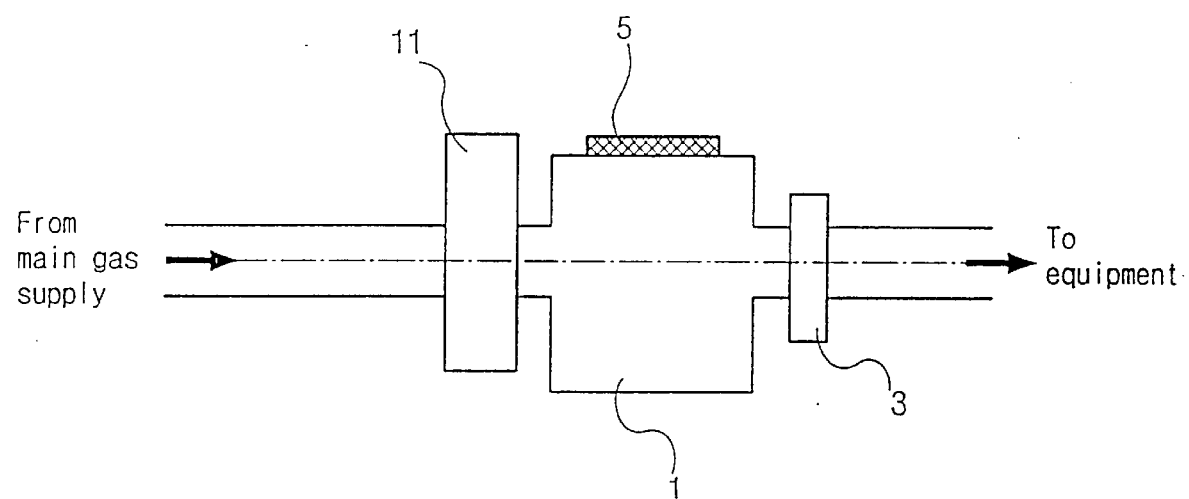
FIG. 1 schematically illustrates the principle of the time based mass flow controller (MFC)

FIG. 1 schematically shows the principle of the time based MFC. The compressible gas is allowed to flow from the main gas supply to a reservoir 1 of known volume and the time taken for the pressure in the reservoir 1 to increase from the prescribed reference empty pressure P to P+δP is measured. Measuring the time taken for the pressure to increase to P+δP is continually repeated throughout the monitoring period. The computers can monitor the pressure change in the reservoir 1 through an electrical signal from a pressure sensor 5. The operating time of an outlet valve 3 can be known by the precise measurement with the clock producer inside the computer.

An outlet valve 3, for instance, a valve operating at high-speed makes the pressure in the reservoir 1 revert to the reference empty pressure P continuously. The outlet valve 3 is controlled by an exclusive chip and when the pressure measured by the pressure sensor 5 reaches to P+δP, the outlet valve 3 is opened and hence the gas is discharged to the gas user equipment. Then, the outlet valve 3 is closed once the pressure has dropped to the reference empty pressure P. The most suitable pressure rise δP for the specified mass flow rate range can be chosen using the reservoir 1 of known volume within a specified flow rate range.

Figure 2A:
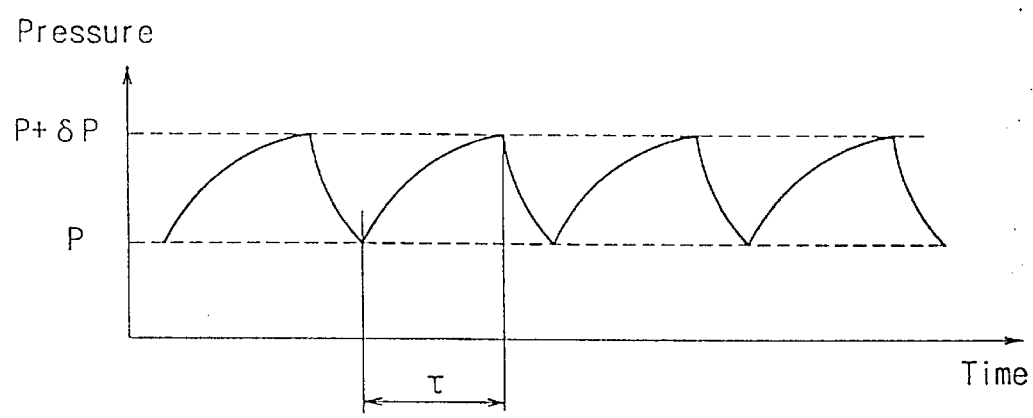
FIGS. 2A, 2B, and 2C show pressure-time histories in the reservoir of FIG. 1 for the medium flow rate, the large flow rate, and the small flow rate, respectively.
Figure 2B:
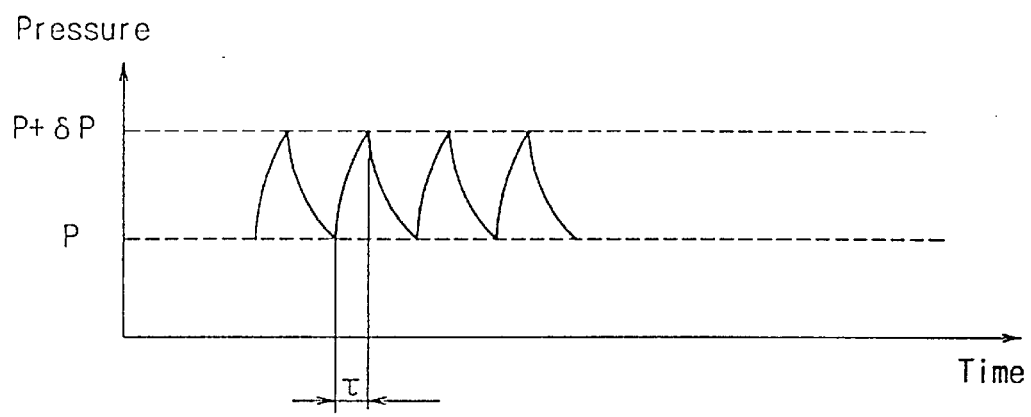
Figure 2C:
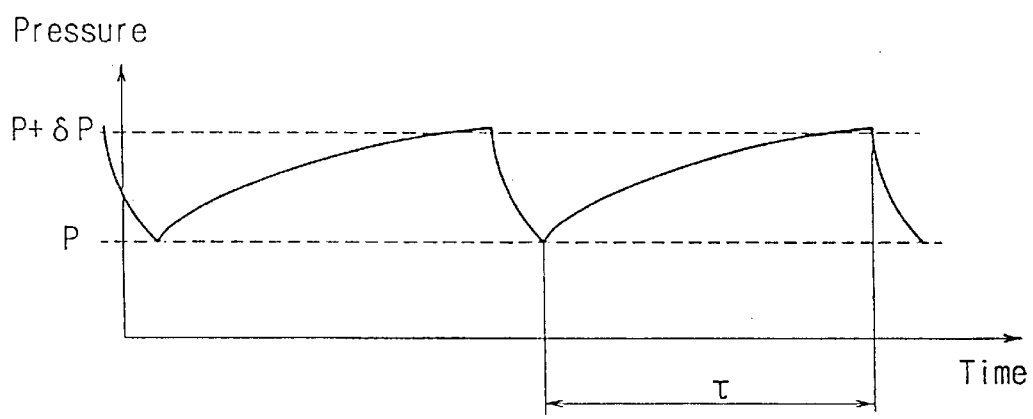

FIGS. 2A, 2B, and 2C show pressure-time histories in the reservoir 1 of FIG. 1 for a medium flow rate, a large flow rate, and a small flow rate, respectively, in the reservoir.

If the flow rate is low, then it takes a long time for the pressure in the reservoir 1 to reach the pre-set pressure, whilst, if the flow is high, then only a short time elapses before the pre-set pressure is reached.

The time or period, τ, taken for the pressure to build up from the reference empty pressure P to P+δP depends on the parameters including:

Those associated with the properties of the fluid, such as its thermodynamic and transport properties, density, ρ, viscosity coefficient, μ, bulk modulus, ξ, and its temperature, T, which will either be known or controllable.

The topology (geometry, L and D) of the duct or cavity, and, of course,

The volume flow rate, VF.

Hence, $$\tau = f_1(\mu, \rho, \xi, T, L, D, VF)$$

Re-arranging this obtain $$VF = f_2(\mu, \rho, \xi, T, L, D, \tau) = f_3(\mu, \rho, \xi, T, L, D)/\tau$$

and $f_3$ is very weak function, which can be assumed to be a constant, $$VF = C/\tau$$

which is a simple function relating volume flow rate, the required variable, to the easy and very accurately measured time, τ.

The shape of the pressure-time curves is similar to the voltage-time curves for a capacitor being charged and discharged between two voltages, V and V+δV. Further, the specific shape of curves becomes increasingly more linear as δP/P is reduced. In this system, the pressure changes are almost linear with time. Therefore, it is only required to monitor the pressure as a triggering signal (absolute P measurement is not required) and measure the time to obtain accurate values of τ.

Figure 3:
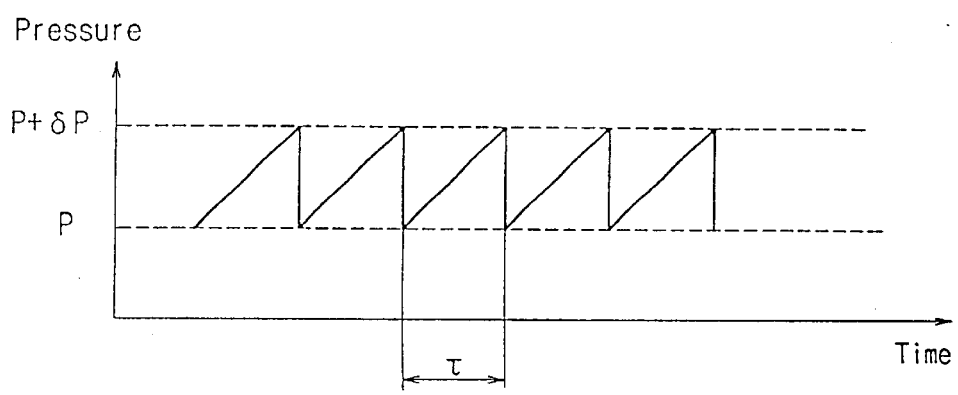
FIG. 3 shows a pressure-time history in the reservoir of FIG. 1 in case of small $\delta P/P$ and large $[dP/dt]_{fall}$.

FIG. 3 shows a pressure-time history in the reservoir 1 of FIG. 1 in case of small δP/P and large $[dP/dt]_{fall}$.

The ideal time based MFC should a) Operate within pressure ranges between P and P+δP, such that δP/P is small. Provided δP/P is sufficiently small, then the rate of rise of pressure dP/dt will approach a constant while the pressure in the reservoir 1 increases.

b) Have a low resistance to flow and/or a relatively high pressure driving difference between the reservoir 1 and the gas user equipment. This will ensure that the rate of fall of pressure from P+δP to the reference empty pressure P in the reservoir 1 will be high. Specifically, $$|dP/dt|_{rise} << |dP/dt|_{fall}$$

c) Operate in a regime where the available supply gas pressure is large compared to P. This will ensure that the operation of the MFC is independent of the gas supply.

Satisfying a) and b) above gives a pressure-time history in the reservoir as shown in FIG. 3.

Figure 4:
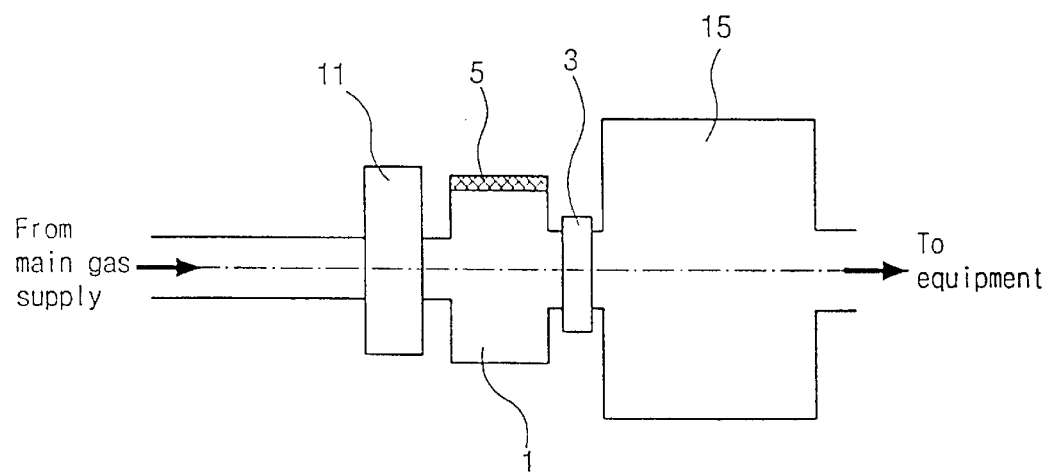
FIG. 4 schematically depicts the principle of the time based MFC with a buffer.

FIG. 4 schematically shows the principle of the time based MFC with a buffer 15.

In addition to the above conditions, the MFC should have sufficient flow buffering capacity between the reservoir 1 and the gas user equipment, so that the minor pressure fluctuation, δP, and the 'flow no-flow' situation in the reservoir, are averaged out to an almost constant pressure and a smooth uniform flow.

The way of achieving the above-condition is to construct the MFC with its own flow smoothing capability that is matched to the reservoir 1. A possible way of doing this is to attach a smoothing buffer 15 on the immediately downstream side of the outlet valve 3. Ensuring that the reservoir 1 has a small volume compared to the buffer 15, and that the hydraulic resistance is very low when the outlet valve 3 is open, provides the required characteristics.

Figure 5:
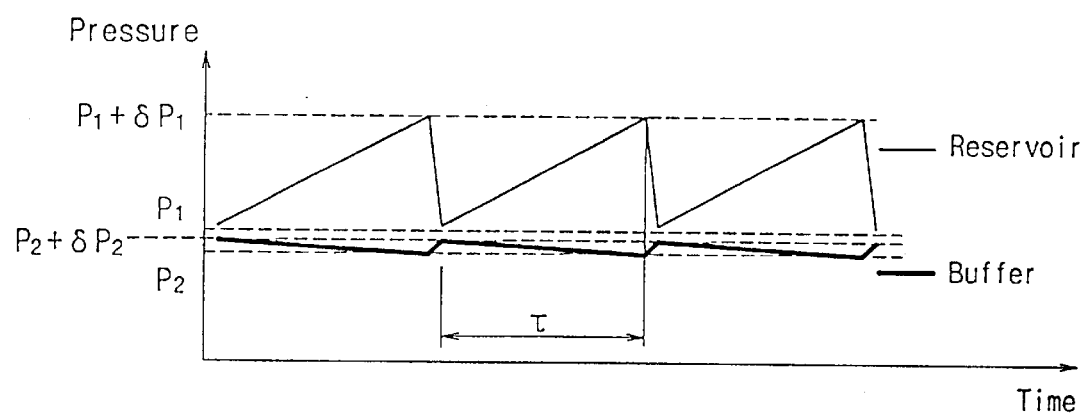
FIG. 5 schematically shows pressure-time histories in the reservoir and the buffer of FIG. 4.

FIG. 5 shows pressure-time histories of the reservoir 1 and the buffer 15 of FIG. 4 roughly. As shown on FIG. 5, a system is set to have $P_1 \approx P_2$, $P_1 >> \delta P_1$ and $\delta P_1 >> \delta P_2$, so that the fluctuation in the pressure and the flow rate leaving the buffer 15 are negligible.

As the time based MFC is operating in a region where $dP_1/dt$ is constant, the pressure in the reservoir 1 is a value (namely $\delta P_1$) directly (and linearly) proportional to $\tau$ plus a pre-set reference empty pressure $P_1$. Therefore, to be able to achieve different mass flow with a continuous mass flow system, the mass flow could be controlled by changing the variable $\tau$. The larger the $\tau$, the larger will be the mass flow. Of course, the mass flow could be controlled by varying the variable fill pressure $P_1+\delta P_1$. However, this undermines the concept of this invention, since the object of this invention is to make the charging/discharging speed (frequency) the standard of the mass flow only by measuring time.

The MFC in FIG. 4 is not basically coincided with the object of this invention, since the supply gas from the main valve 11 as well as the accumulate gas at the reservoir 1 continuously flows through the reservoir 1 to the gas user equipment when the outlet valve 3 is open. This problem could be solved through the 'bucket-and-stopwatch' method by taking 'fill up and empty the bucket' with desired velocity.

Probably the best and most accurate method of measuring the flow rate from a water tap is to place a bucket of known volume under the tap and then measure the time taken to fill the bucket. The volume flow rate is simply the volume of the bucket divided by the time taken to fill it, and the mass flow rate is equal to the volume flow rate times the density of the water.

Figure 6:
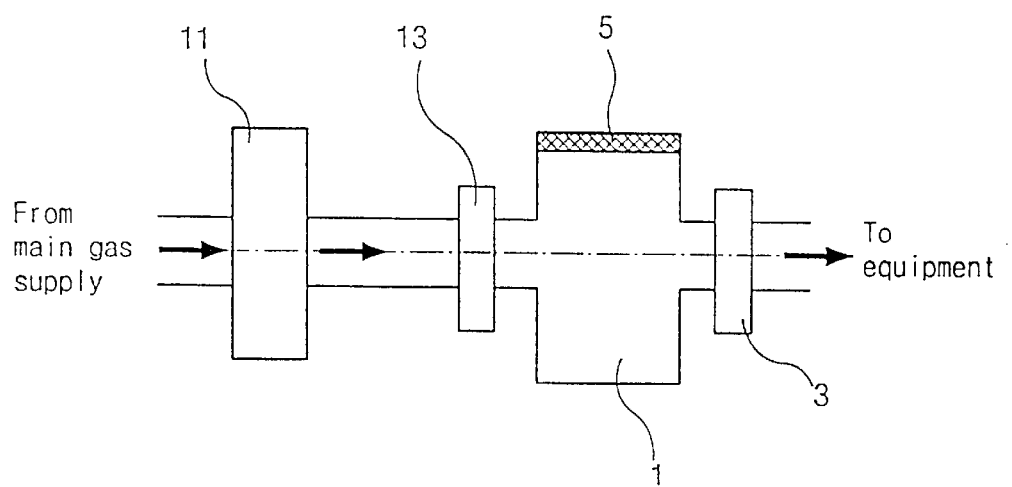
FIG. 6 schematically shows the time based MFC according to the first embodiment of this invention.

FIG. 6 schematically shows the time based MFC according to the first embodiment of this invention. As shown, the MFC includes an inlet valve 13, the outlet valve 3 and the main valve 11 for regulating the mass flow rate of the inflow gas into the reservoir 1.

Also, the time based MFC could be additionally equipped with a temperature sensor to measure the gas temperature in the reservoir 1. For instance, a thermocouple or a semiconductor temperature measurement device can be used as the temperature sensor. If the gas in the reservoir 1 is an ideal gas, the following expression is satisfied: (the gas law equation for an ideal gas is used for the convenience of explanation, so it is surely needed to use the gas law equation for a non-ideal gas or to correct adequately in the actual mass flow control.

$$Pv = RT/M \text{ (R is a universal gas constant)}$$

According to the above equation, the specific volume and the density could be obtained with known gas temperature and the pre-set fill and empty pressure. The mass of the gas stored in the reservoir could be known by multiplying the volume of the reservoir by the density in the states of the fill and empty pressure. In other hands, the opening/closing speed (the number of opening/closing loops per unit time) of the inlet valve 13 and the outlet valve 3 is easily obtained only by measuring the time. Therefore, the mass/volume flow rate is acquired easily. For instance, if the mass flow rate is smaller than the value required, the volume of the reservoir 1 would be increased.

In case of performing the control of flow in a fixed volume-flow mode, the control can be achieved by keeping the opening/closing speed of the valves constant without dependence on temperature. In this mode, the mass flow has small value at high temperature and large value at low temperature.

In case of performing the control of flow in a fixed mass-flow mode, the control can be achieved by controlling the opening/closing speed of the valves. In this mode, the volume flow is increased as temperature goes up and it is decreased as temperature goes down.

Assume a 1% adiabatic pressure rise in the reservoir 1 from $P_1$ to $1.01P_1$. On discharge, the pressure in the reservoir 1 returns to $P_1$. The volume of a (ideal) gas passing through the reservoir 1 per loop could be calculated by the gas flow equation for an ideal gas. For example, assuming that the calculated value is X % of the volume of the reservoir and that the volume of the reservoir 1 is 1 ml, the volume of gas passing through the reservoir 1 per loop is 0.01X ml/loop. Assuming that the volume flow rate to obtain is 0.1 ml/min, the loop rate (the number of opening/closing loops of the inlet valve 13 and the outlet valve 3 per unit time) is the volume flow rate divided by the gas volume passing through the reservoir 1 per loop, namely, 0.1 ml/min÷0.01X ml/loop. If the volume flow rate desired is 10 ml/min, the loop rate becomes 10 ml/min÷0.01X ml/loop. Namely, the mass/volume flow rate is expressed as the product of the number of opening/closing loops of the inlet valve 13 and the outlet valve 3 per unit time by the mass/volume of the gas stored and discharged at the reservoir 1 per each opening/closing loop of the inlet valve 13 and the outlet valve 3. Therefore, the flow rate can be controlled through controlling these conditions.

The factors which affect the number of opening/closing loops of the inlet valve 13 and the outlet valve 3 per unit time and the mass/volume of the gas stored and discharged at the reservoir 1 per each opening/closing loop of the inlet valve 13 and the outlet valve 3 are the charging time $\tau$, the volume of the reservoir 1, the opening level of the main valve 11, the time delay, etc. That is, the way of controlling the flow rate can be classified into four types as follow: The flow rate could be controlled a) By varying the charging time ($\tau$) of the reservoir 1,
b) By varying the volume of the reservoir 1,
c) By varying the opening level of the main valve 11 to give a change to the flow rate of the inflow gas to the reservoir 1, and
d) By varying a time delay.

Those variables could be used for the flow rate control independently or together. On the actual execution of the above four controlling methods, the control manager could control the flow rate by giving the prescribed value corresponding to the flow rate based on the known experimental data (or formula), by correcting the pre-set value through interpreting the result of the flow rate, or by carrying out both methods.

For instance, compute the resulting value (based on the known data) for the flow rate after performing a certain loop with controlling the main valve 11. If there is a little difference from the desired flow rate, it can be corrected by additionally controlling the main valve 11. As another example, based on the known data, compute the resulting value for the flow rate after performing the gas streaming of a certain loop while controlling the volume of the reservoir 1. If there is a little difference from the desired flow rate, it can be corrected by giving a time delay.

The correction table or the correction formula could be developed empirically and it can then be reflected for implementing the actual control. In the preliminary experiments for obtaining the empirical database, it may be needed to measure the precise gas state under the empty and fill pressure using the temperature sensor.

A more concrete explanation about the first type of MFC control method described above follows:

a) The MFC should work such that the outlet valve 3 is closed on every opening of the inlet valve 13.

b) The pressure in the reservoir 1 increases from the reference empty pressure $P_1$.

c) The inlet valve 13 is closed after a pre-set time.

d) The outlet valve 3 is opened. The outlet valve 3 is under the opening state until the pressure in the reservoir 1 returns to the reference empty pressure $P_1$.

Therefore, the flow rate could be controlled simply through varying the time for charging the reservoir 1.

The mass/volume of the gas stored and discharged at the reservoir 1 per each opening/closing loop of the inlet valve 13 and the outlet valve 3 in the first type of the MFC control method above could be obtained as follows:

As a preliminary experimental step, the property, for example, the temperature, of the gas in the reservoir 1 at the reference empty pressure is measured. Also, the state of the gas flowing into the reservoir 1 through the inlet valve 13 is measured. Since the first type of the MFC control method is controlling the flow rate by changing the pre-set time period ($\tau$) only, the gas state in the reservoir under the reference empty pressure and the state of the gas flowing into the reservoir 1 through the inlet valve 13 can be treated as constant during the control process, and thus could be applied equally for the gas flow control at the various flow rates by one time measurement.

As the next actual control step, the control loop for the flow rate is performed by opening the inlet valve 13 and closing it after a pre-set time ($\tau$). In this case, the amount of the gas stored and discharged at the reservoir 1 per loop could be obtained as follows. If $[dP/dt]_{rise}$ is constant, the gas pressure rise in the reservoir 1 after a pre-set time ($\tau$) is expressed by multiplying $[dP/dt]_{rise}$ by a pre-set time ($\tau$). Also, the multiplication of the value of the mass flow rate of the gas flowing into the reservoir 1 through the inlet valve 13 (the mass flow rate of the gas flowing into the reservoir 1 through the inlet valve 13 has a constant value, since the pressure of the gas supplied is greater than P) by the pre-set time ($\tau$) yields the mass of the gas flowing into the reservoir 1 for the pre-set time ($\tau$), namely the mass of the gas stored and discharged at the reservoir 1 per loop.

However, the gas mass value calculated above is a theoretical value taken from the appropriate assumption. The precise control of the flow rate could be achieved by referring to a flow rate table. The flow rate table must include the mass values of the gas stored and discharged at the reservoir 1 for various pre-set times, $\tau$, the mass values being able to be empirically obtained through preliminary experiments to measure the gas state in the reservoir 1 at the reference empty pressure and after various pre-set times, $\tau$, respectively.

The specific volume of the gas in the reservoir 1 after a pre-set time could be obtained as follows: According to the law of mass conservation (continuous equation), the gas mass in the reservoir 1 is expressed as the sum of the gas mass flowing into the reservoir 1 and the gas mass under the reference empty pressure state. Therefore, the gas mass in the reservoir after a pre-set time could be obtained easily. The specific volume of the gas after a pre-set time could be calculated by dividing a known reservoir volume by the mass of the gas in the reservoir 1 after the pre-set time.

Description about the second type of the MFC control method is given in detail as follows: Control the inlet valve 13 to open at the reference empty pressure in the reservoir 1 and to close at the reference fill pressure in the reservoir 1. Control the outlet valve 3 to close at the reference empty pressure of the reservoir 1 and to open at the reference fill pressure in the reservoir 1. Control the volume of the reservoir 1 by using a volume-variable storage. In this case, increase the volume of the reservoir 1 to increase the mass flow rate and decrease the volume of the reservoir 1 to decrease the mass flow rate.

Figure 7:
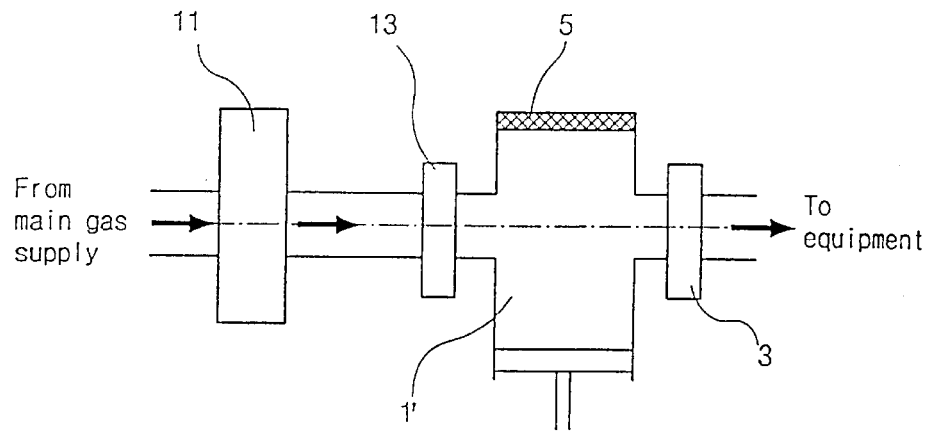
FIG. 7 schematically shows the time based MFC according to the second embodiment of this invention.

FIG. 7 schematically shows the time based MFC in which the reservoir volume is changeable according to the second embodiment of this invention. As shown, a reservoir 1' has a cylinder-piston shape. Preferably, the stepper motor is used for the control of the piston displacement. It is desirable to use the small volume reservoir and large volume reservoir to control the gas flow within a small range and a large range of the flow rate, respectively. The most appropriate reservoir volume can be chosen using an appropriate software/hardware and then, the most precise measurement and control for the gas flow could be achieved.

Description about the third type of the MFC control method is given in detail as follows: Varying the opening level of the main valve 11 changes the time for charging the reservoir 1 with gas in result (even if $P_1$ and $\delta P_1$ are not changed, the time taken to increase the pressure from $P_1$ to $\delta P_1$ in the reservoir 1 is varied), and thus changes the gas flow rate supplied to the gas user equipment in result. In order to control the flow rate to the gas user equipment within a large range of flow rate, increase the opening level of the main valve 11. On the contrary, to control the flow rate to the gas user equipment with the small range of flow rate, decrease it. It changes the total reaction characteristic of the MFC.

Description about the fourth type of the MFC control method is given in detail as follows: Although a time delay is provided between a closing of the inlet valve 13 and an opening of the outlet valve 3 and/or between a closing of the outlet valve 3 and an opening of the inlet valve 13, the mass/volume of the gas stored in the reservoir 1 per unit opening/closing loop is not changed. However, the elapsed time per loop is changed, and thus the mass/volume flow rate of the outflow gas from the reservoir 1 is changed in result.

Figure 8:
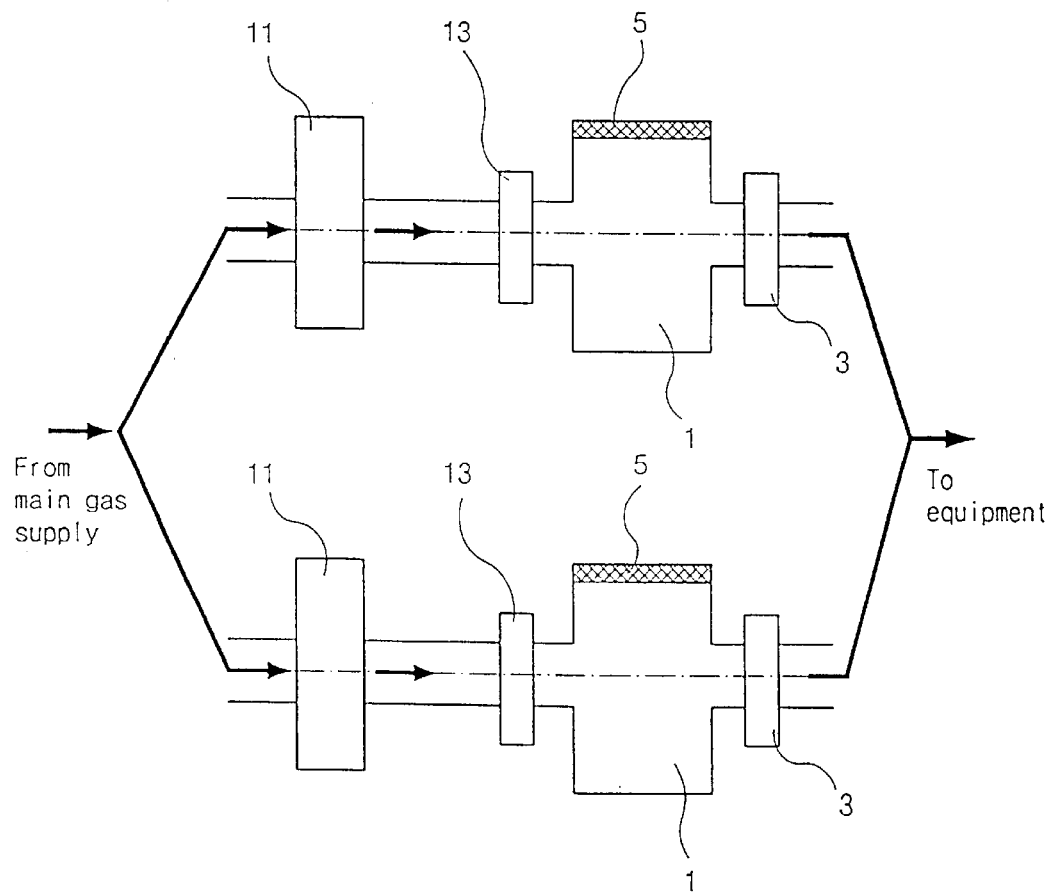
FIG. 8 schematically shows the time based MFC according to the third embodiment of this invention, showing that the time based MFC of FIG. 6 could be connected in parallel.

FIG. 8 schematically shows the time based MFC according to the third preferred embodiment of this invention. It shows that a plurality of the time based MFC of FIG. 6 could be connected in parallel. Also, by setting the length of the flow lines from each reservoir 1 to the final gas user equipment different, the perturbation of the gas flow rate to the gas user equipment could be avoided. That is, the perturbation of the gas flow rate to the gas user equipment could be avoided by splitting the gas supply to the gas user equipment time by time.

According to a more preferred embodiment, the perturbation of the flow rate to the gas user equipment could be avoided by controlling the opening/closing time points differently for each MFC.

Figure 9A:
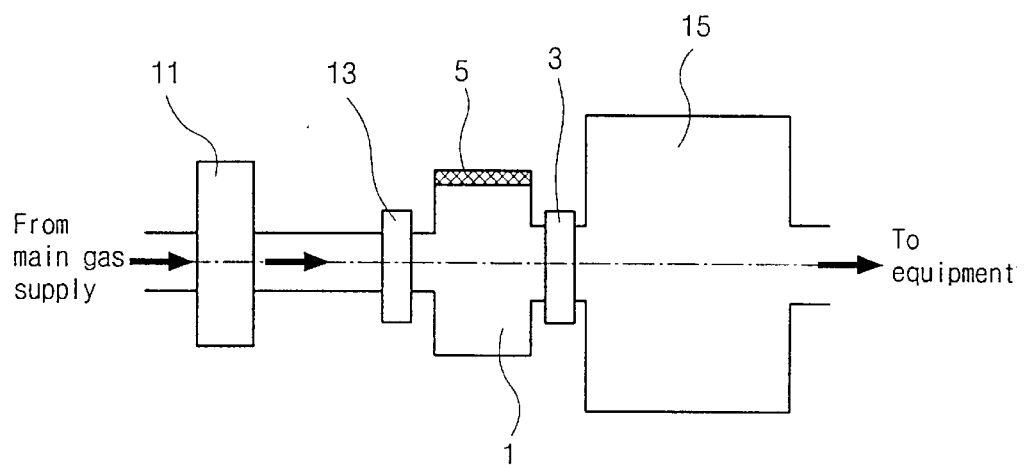
FIGS. 9A, 9B, and 9C schematically show the time based MFC with a buffer according to the fourth embodiment of this invention.
Figure 9B:
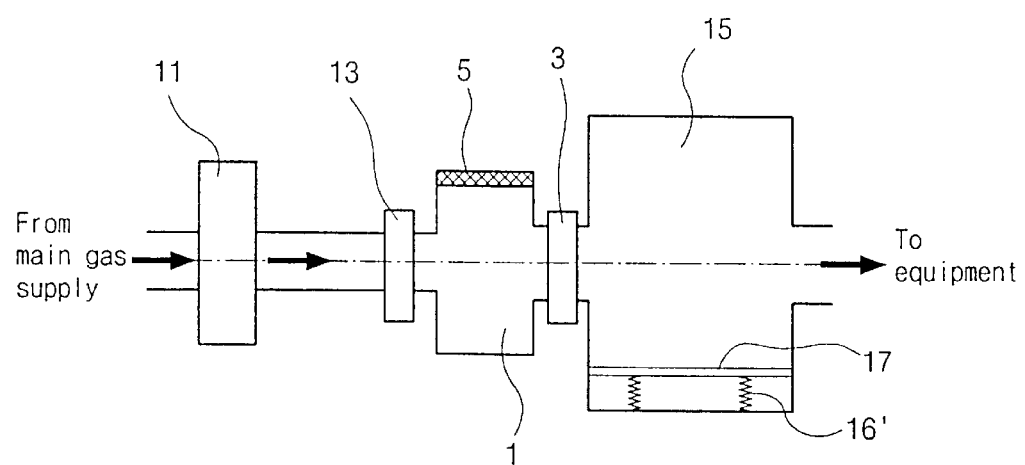
Figure 9C:
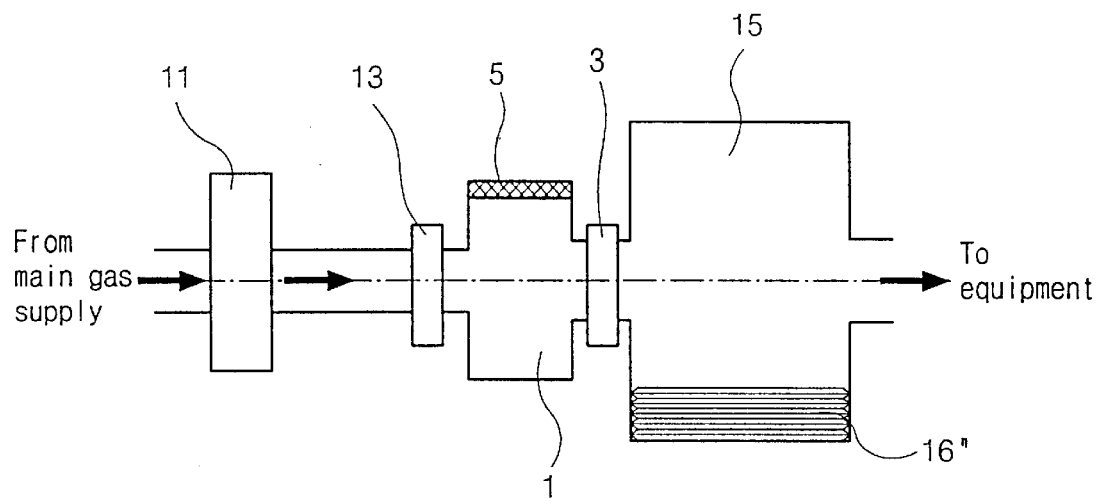

FIGS. 9A, 9B and 9C schematically show the time based MFC with a buffer 15 according to the fourth embodiment of this invention. FIG. 9A shows another embodiment to avoid the perturbation of the gas flow rate to the gas user equipment. The MFC in FIG. 9A has the advantage of avoiding the perturbation of the gas flow rate by only a relatively simple installation of a buffer 15. The MFC in FIG. 9A could have plural sets of the reservoirs 1 and the buffers 15 like the MFC shown in FIG. 8.

As shown in FIGS. 9B and 9C, the buffer 15 with a variable volume can be used in order to more diminish the perturbation in the gas flow rate to the gas user equipment. FIGS. 9B and 9C show that the buffer 15 can have a spring means which acts against the gas pressure in the buffer 15. In FIG. 9B, the spring means has a movable wall 17 and a coil spring 16'. The moveable wall 17 has the interior face on which the gas pressure in the buffer 15 is applied and he exterior face on which the coil spring 16' acts against the gas pressure in the buffer 15. FIG. 9C shows that a pneumatic spring 16" can be used as the spring means.

Figure 10:
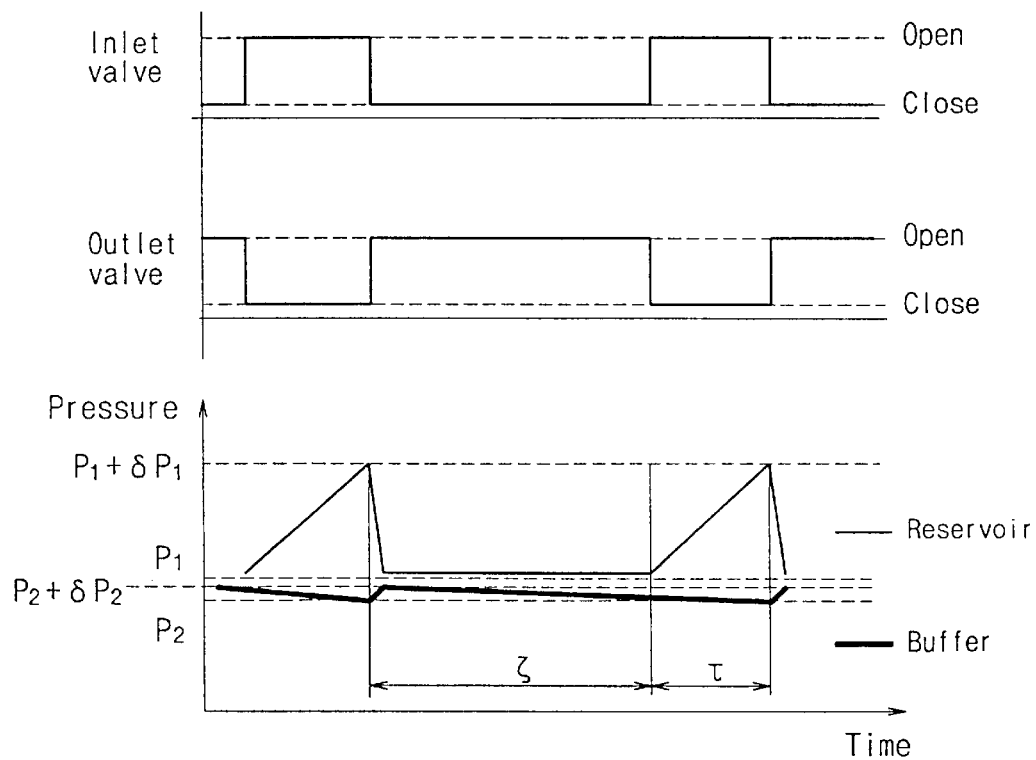
FIG. 10 shows states of the inlet valve and the outlet valve and pressure-time histories in the reservoir and the buffer of the MFC in FIG. 9A.

FIG. 10 shows states of the inlet valve 13 and the outlet valve 3 and pressure-time histories in the reservoir 1 and the buffer 15 for the time based MFC in FIG. 9.

Focusing on the first type of the MFC control method, the gas mass stored in the reservoir 1 could be determined by defining $\tau$. The gas, which has such a mass value, is supplied to the gas user equipment in a period, $\tau+\xi$. This means that the flow rate could be controlled through controlling $\tau$, if the characteristics of the flowing material and the volume of the bucket are fixed. The most important point here is that the mass flow rate is expressed as a function of the time only.

Figure 11A:
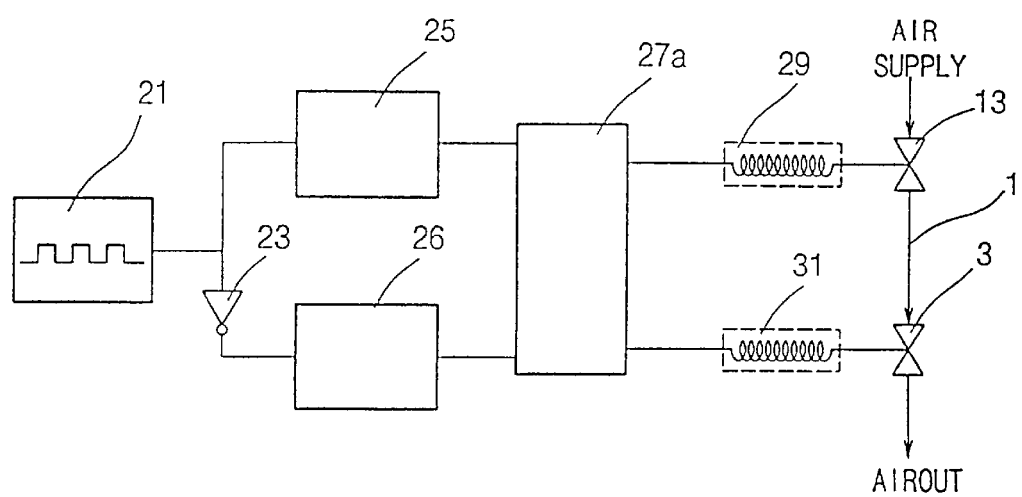
FIGS. 11A and 11B schematically show an actual structural example of a prototype MFC to explain the basic principle for the flow control in this invention, in which FIG. 11A schematically shows the structure of the prototype MFC, and FIG. 11B schematically shows the phase relationship between the oscillator signal and the timer delay signals triggered by the oscillator signal.
Figure 11B:
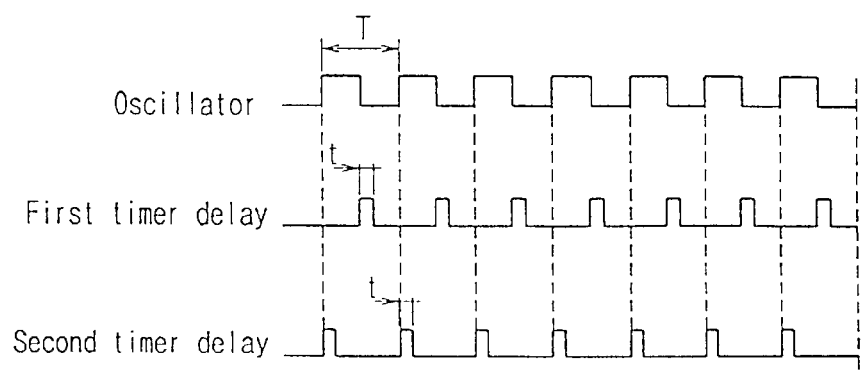

FIGS. 11A and 11B schematically show an actual structural example of a prototype MFC and the basic principle for the flow control in this invention. FIG. 11A schematically shows the structure of the prototype MFC. FIG. 11B schematically shows the general phase relationship between the oscillator signal and the timer delay signals triggered by the oscillator signal. As shown, the prototype MFC includes an oscillator 21, a NOT gate (inverter) 23, two timer delays 25 and 26, a power driver 27a, two solenoids 29 and 31, the inlet valve 13, and the outlet valve 3. LEGO Pneumatic valves were used for the inlet valve 13 and the outlet valve 3. A section of LEGO Pneumatic tubing was used as the reservoir 1. A plastic lemonade bottle was used for the gas supply.

As these timer delay signals were triggered on the falling edge of the oscillator signal, a NOT gate 23 was installed between the oscillator 21 and the second timer delay 26 so that the first timer delay 25 and the second timer delay 26 were triggered alternately.

Figure 12:
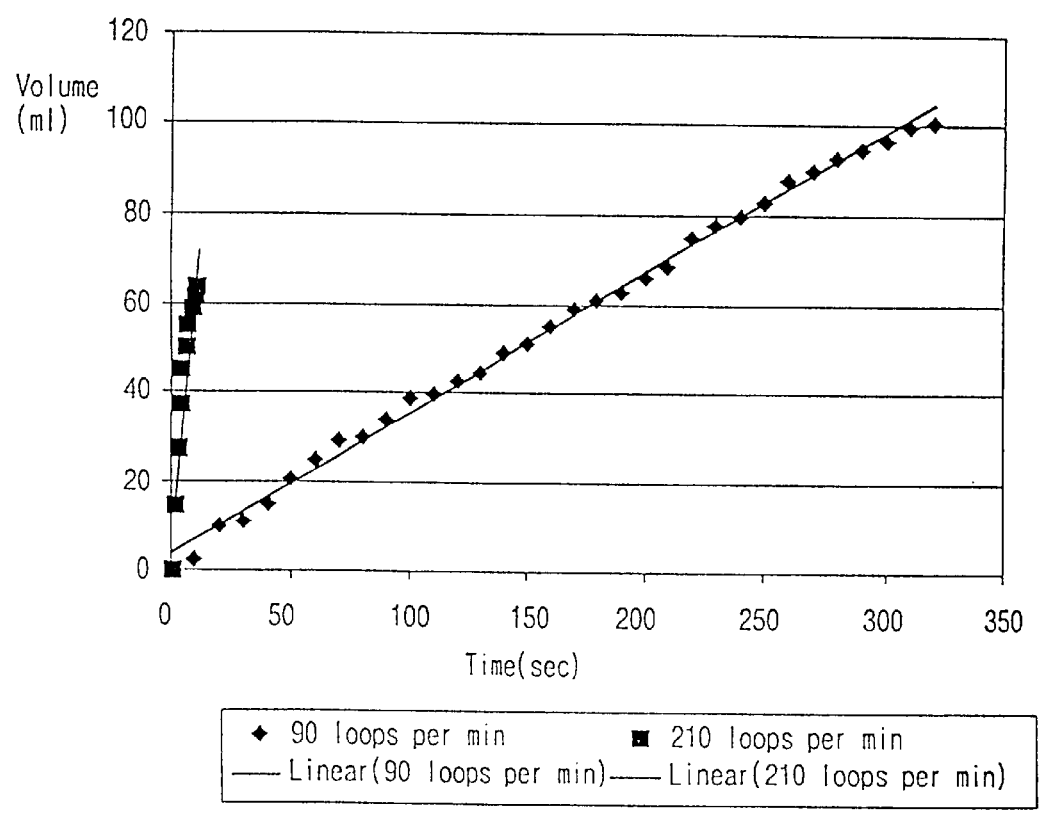
FIG. 12 shows the relationship between time and the gas volume passing through the reservoir 1 in the MFC in FIG. 11A, showing the experimental results for 90 loop/min and 210 loop/min, respectively.
Figure 13:
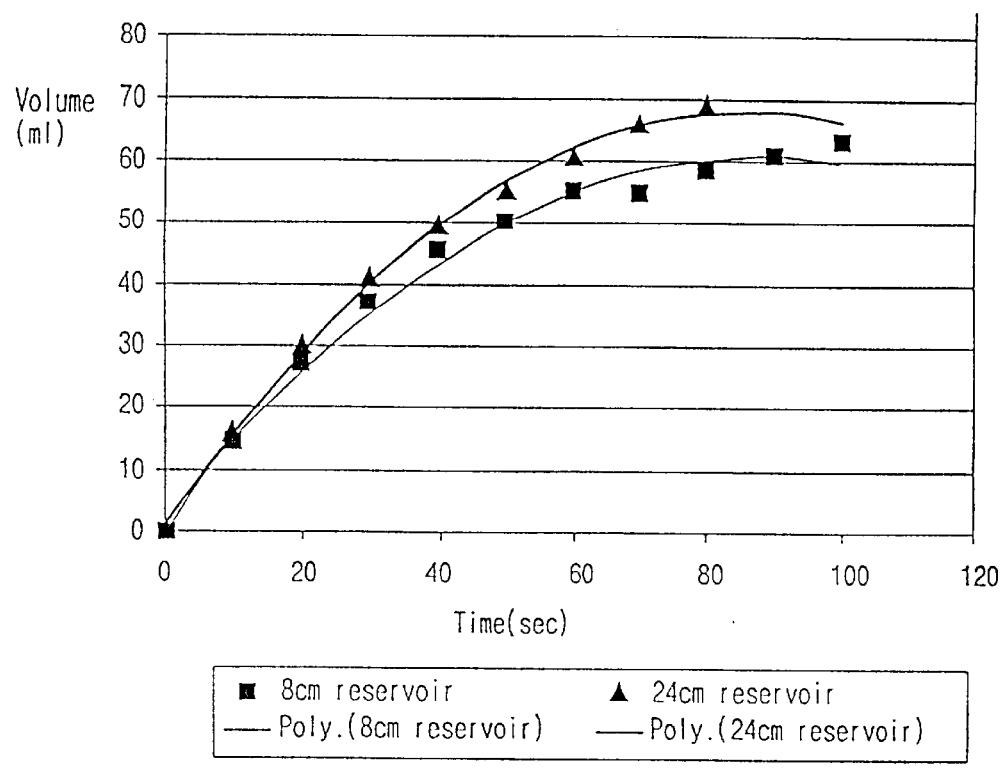
FIG. 13 shows the relationship between time and the stored gas volume in the prototype MFC in FIG. 11A, in which the experimental results for a reservoir with an 8 cm length and 24 cm length respectively are shown.

This inventor did experiments using the MFC shown in FIGS. 11A and 11B and the experimental result is shown in FIGS. 12 and 13.

FIG. 12 shows the relationship between time and the gas volume passing through the reservoir 1 in the MFC of FIG. 11A. It shows the experimental results for 90 loops/min and 210 loops/min, respectively. The reservoir 1 with an 8 cm length and a 4 mm diameter storage tube was used. As shown, as the loop velocity was increased from 90 loops/min to 210 loops/min, the flow rate was increased from 20 ml/min to 350 ml/min.

FIG. 13 shows the relationship between time and the stored gas volume in the prototype MFC shown in FIG. 11A. The experimental results for the reservoir 1 with a diameter of 4 mm and lengths of 8 cm and 24 cm are shown. As shown in FIG. 13, as the reservoir length was increased from 8 cm to 24 cm, the flow rate was increased. The inclination of each curve decreased with time and then each curve passed the plateau of 0 inclination. This was due to the decrease in the pressure of the gas supply.

Figure 14A:
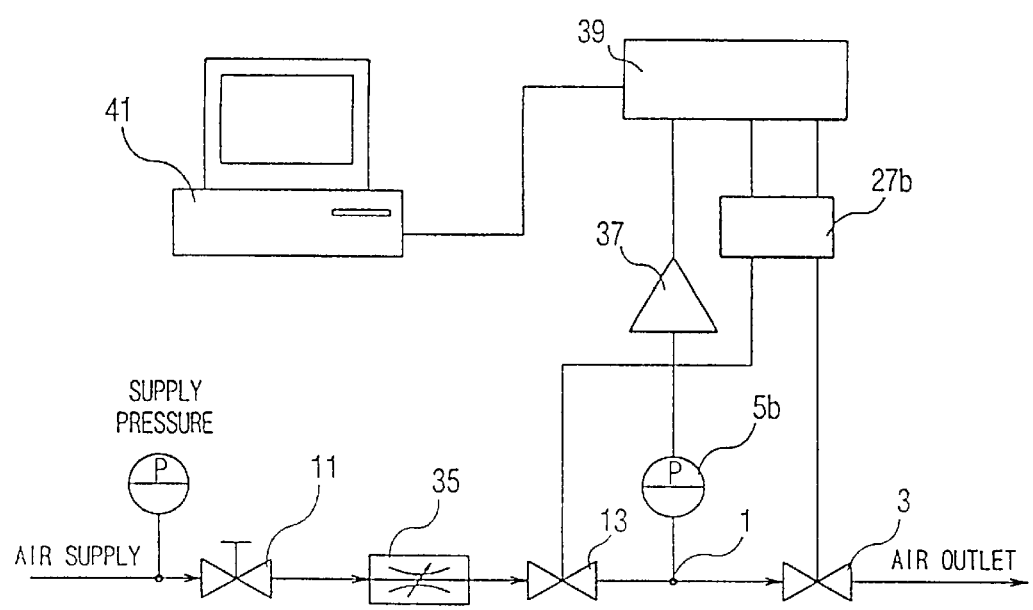
FIG. 14A schematically shows an actual structural example of the MFC according to this invention.

FIG. 14A schematically shows an actual structural example of the MFC according to a preferred embodiment of this invention. Although the prototype MFC is useful to explain the basic principle of this invention, it has limitations to fully realize this invention. For example, the uniform charging of the reservoir is not guaranteed in the prototype MFC. To overcome such limitations, the MFC was constructed as shown on FIG. 14A.

The MFC in the FIG. 14A includes a main valve 11, a pressure regulator 35, an inlet valve 13, a reservoir 1, an outlet valve 3, a transducer 5b, an amplifier 37, an analogue/digital interface 39, a power driver 27b, and a PC 41 equipped with an A/D converter card. The output from the transducer 5b was amplified by the amplifier 37, so that the A/D converter may interpret the output.

Figure 14B:
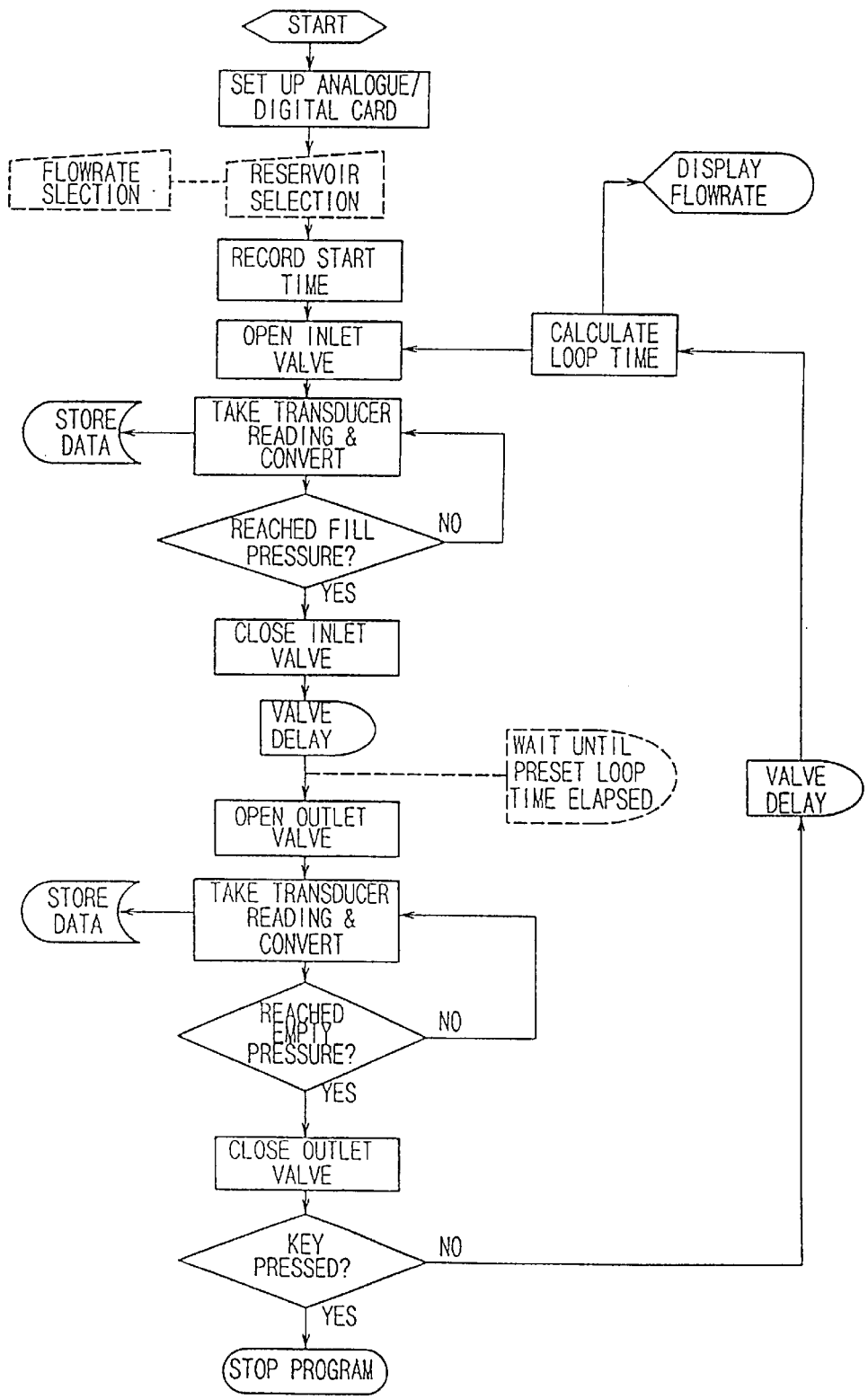
FIG. 14B shows a flow chart of the execution program executed in the PC of the MFC shown in FIG. 14A.

FIG. 14B shows the flow chart of the execution program executed in the PC of the MFC shown in FIG. 14A. Since it requires time (even if it is very short) to interpret the pressure, the A/D interpreting delay is needed so that the array can have a perfect charging/discharging data.

The loop rate was calculated as follows: Each time that the program went through the loop of charging and discharging the reservoir 1, the total time for that loop was stored. The program then added together the number of loops that had been carried out and the time taken and thus a loop rate could be calculated. Some irregular charging/discharging processes can be included. Namely, some charging/discharging processes may be much shorter than the average loop rate. This problem can be solved within a reasonable range by increasing the loop delay to the required number of loops (20 loops for example). Therefore, the actual interpreted value is guaranteed to be not the previous value but the present value.

Figure 15:
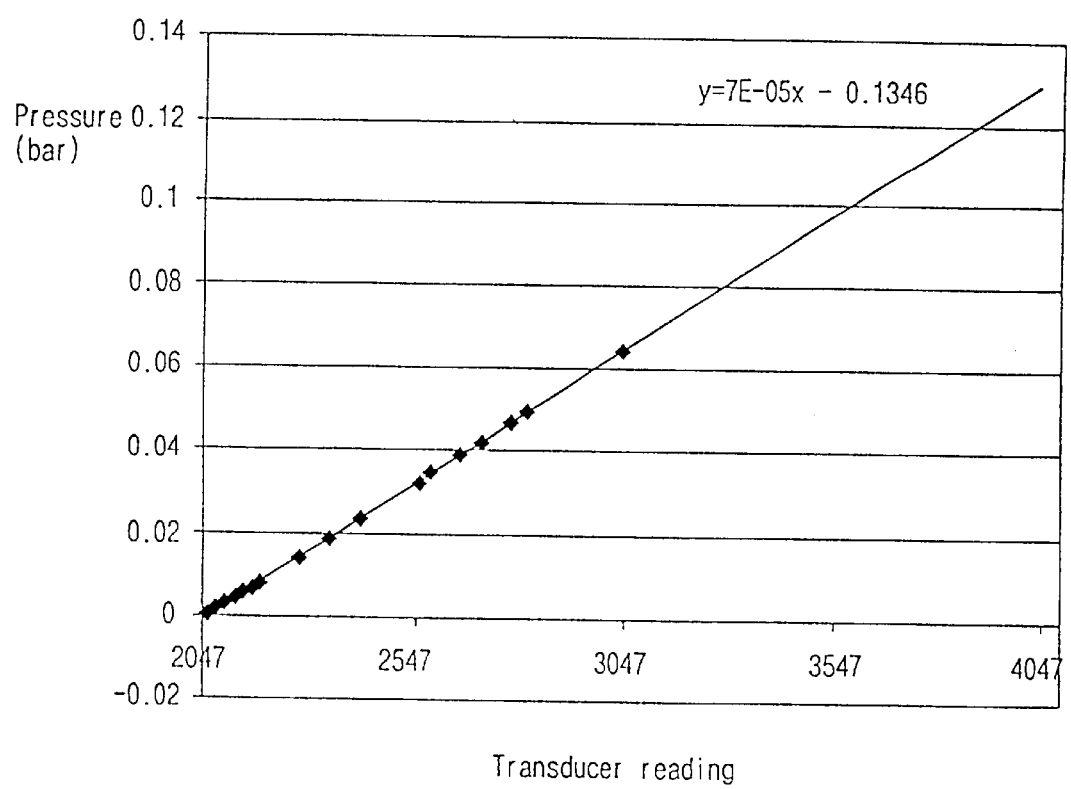
FIG. 15 shows the relationship between the digital value converted by the A/D converted and the pressure in the reservoir.

The inventor did experiments using the MFC shown in FIGS. 14A and 14B and the experimental results are displayed in FIGS. 15 through 19. FIG. 15 shows the relationship between the digital value converted by the A/D converter and the pressure in the reservoir 1. The analogue voltage signal was converted into digital signal value and an input voltage in the range −10~10V was converted into one of 4096 discrete digital signal values. The digital values 4095 and 2047 correspond to 10V and 0V, respectively and they are in a linear relationship. These values did not need to be converted into the pressure because the important value in this invention was not the pressure but the repeating rate, although the measurement with the pressure transducer was performed to know the behavior of the system and to apply it for the design of a system.

Figure 16A:
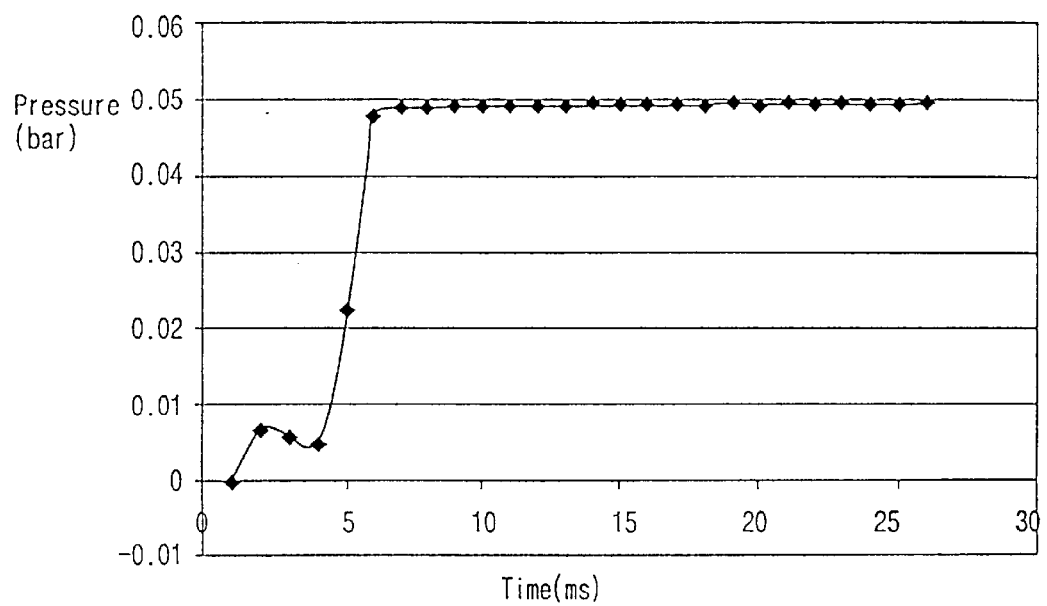
FIG. 16A shows the pressure in the reservoir versus time during the charging process in the MFC of FIG. 14A.

FIG. 16A shows the pressure in the reservoir 1 versus time during the charging process. A reservoir with a 2 mm diameter was used. As shown, on the initial charging of the reservoir, a considerable amount of time is required because the pressure in the reservoir 1 needs to rise from 0 Bar up to 0.05 Bar. However, once the reservoir 1 had been charged for the first time, the charging process took just a fraction of time.

Figure 16B:
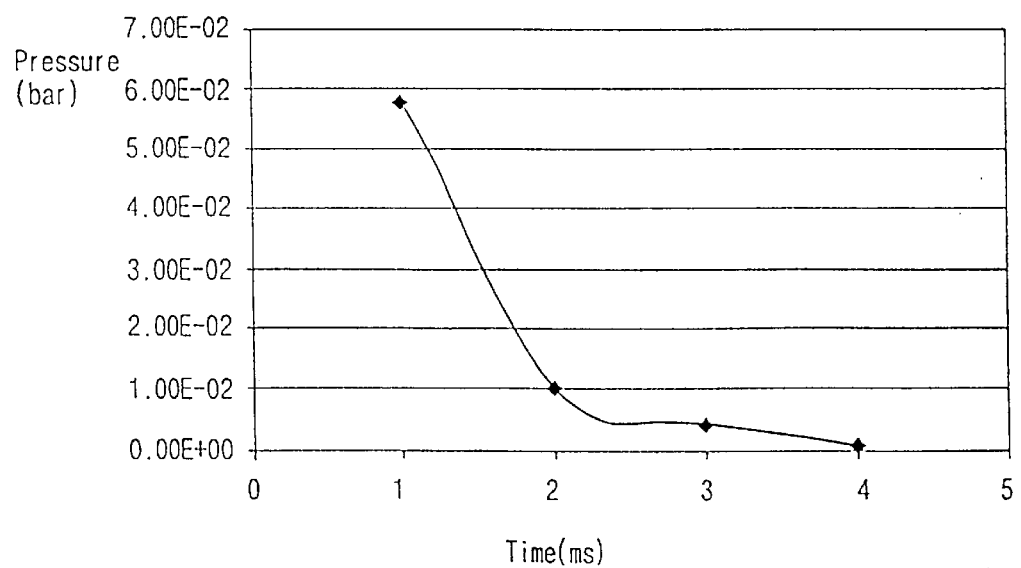
FIG. 16B shows the pressure in the reservoir versus time during the discharging process in the MFC of FIG. 14A.

FIG. 16B shows the pressure in the reservoir 1 versus time during the discharging process.

Figure 16C:
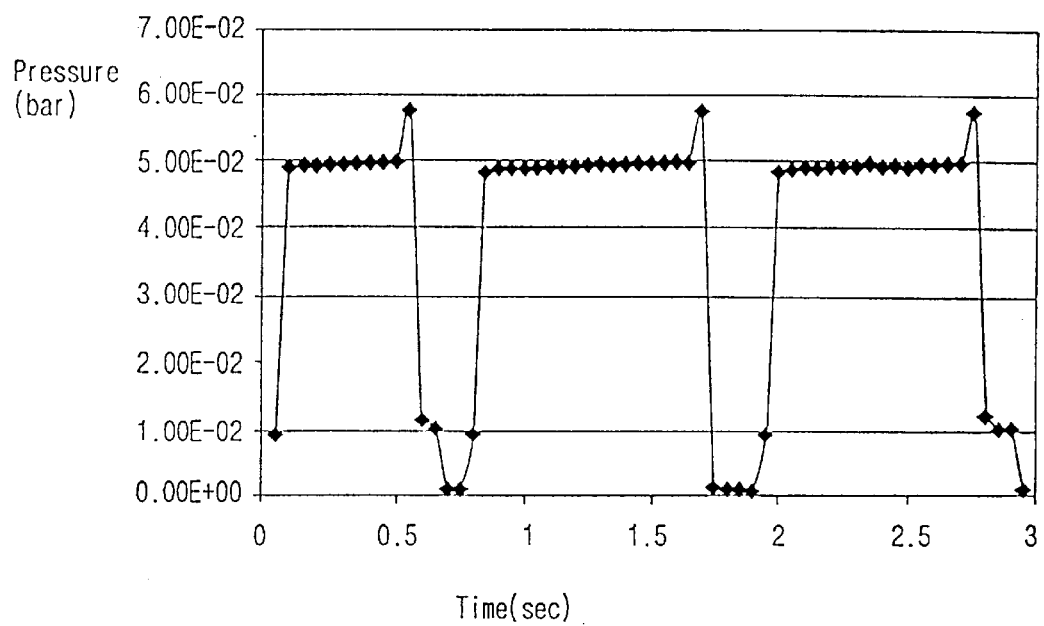
FIG. 16C shows the pressure in the reservoir versus time for a series of reservoir chargings and dischargings in the MFC of FIG. 14A.

FIG. 16C shows the pressure in the reservoir versus time for a series of reservoir chargings and dischargings. As shown in FIG. 16C, charging and discharging characteristics showed a very steep initial rise of 15 Bar/s. This was due to the pressure build up in the system just before the inlet valve 13 while the system waits for the reservoir 1 to be discharged. The constant but small pressure rise happened just before the closing of the inlet valve 13.

Figure 17A:
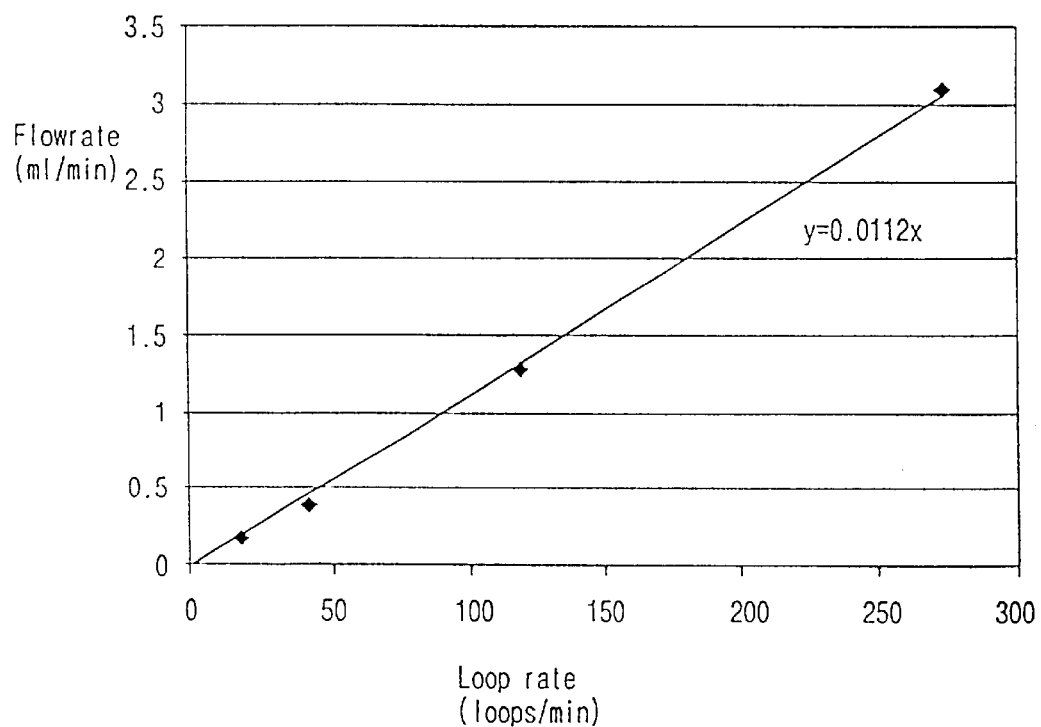
FIG. 17A shows the relationship between the flow rate and the loop rate for a fill pressure of 0.05 Bar and an empty pressure of 0.002 Bar in a 1 mm diameter reservoir in the MFC of FIG. 14A.

FIG. 17A shows the relationship between the flow rate and the loop rate for a fill pressure of 0.05 Bar and an empty pressure of 0.002 Bar in a 1 mm diameter reservoir. To deal with the various kinds of flow rates, this inventor performed experiments for the reservoir 1 of various sizes. First, the 1 mm diameter reservoir was manufactured and experimented, and the loop rate and the flow rate had a linear relationship with a slope of 0.0112 in result.

Figure 17B:
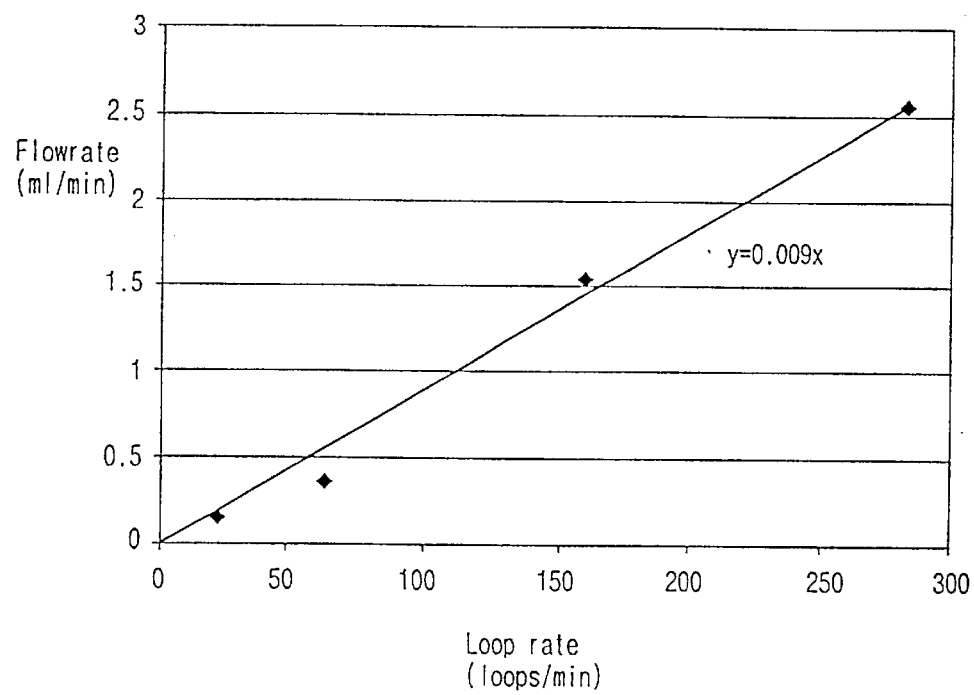
FIG. 17B shows the relationship between the flow rate and the loop rate for a fill pressure of 0.05 Bar and an empty pressure of 0.002 Bar in a 2.5 mm diameter reservoir in the MFC of FIG. 14A.

FIG. 17B shows the relationship between the flow rate and the loop rate for the fill pressure of 0.05 Bar and the empty pressure of 0.002 Bar in a 2.5 mm diameter reservoir. As shown, the slope in 0.009.

Figure 17C:
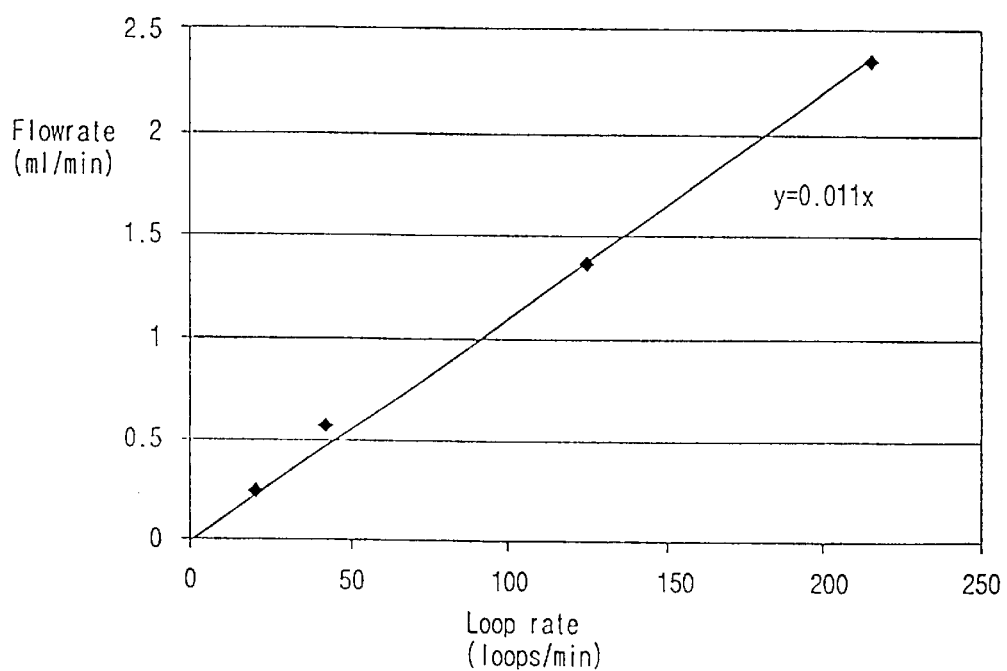
FIG. 17C shows the relationship between the flow rate and the loop rate for a fill pressure of 0.05 Bar and an empty pressure of 0.002 Bar in a 4 mm diameter reservoir in the MFC of FIG. 14A.

FIG. 17C shows the relationship between the flow rate and the loop rate for the fill pressure of 0.05 Bar and the empty pressure of 0.002 Bar in a 4 mm diameter reservoir. As shown, the slope 0.011.

Figure 17D:
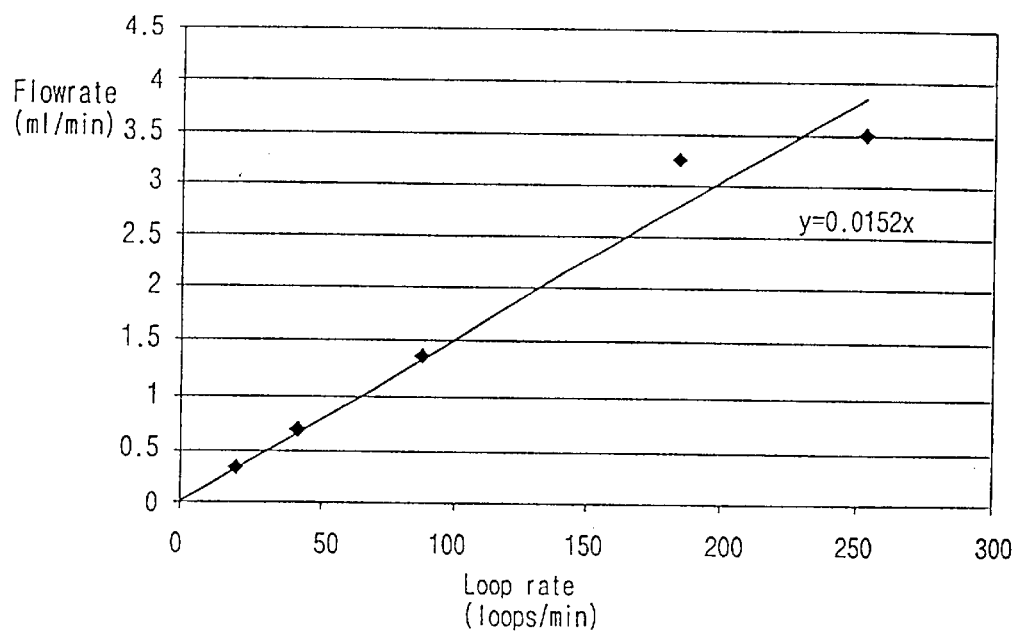
FIG. 17D shows the relationship between the flow rate and the loop rate for a fill pressure of 0.05 Bar and an empty pressure of 0.002 Bar in a 5.5 mm diameter reservoir in the MFC of FIG. 14A.

FIG. 17D shows the relationship between the flow rate and loop rate for the fill pressure of 0.05 Bar and the empty pressure of 0.002 Bar in a 5.5 mm diameter reservoir. As shown, the slope is 0.0152.

As known from the experimental results shown in FIGS. 17A through 17D, the flow rate of the medium which passes through the reservoir 1 can be controlled through changing the volume of the reservoir 1. The anomaly that the 1 mm reservoir 1 had a steeper gradient than the 2.5 mm reservoir 1 may be due to the way the sensor was connected to the reservoir 1.

Figure 18A:
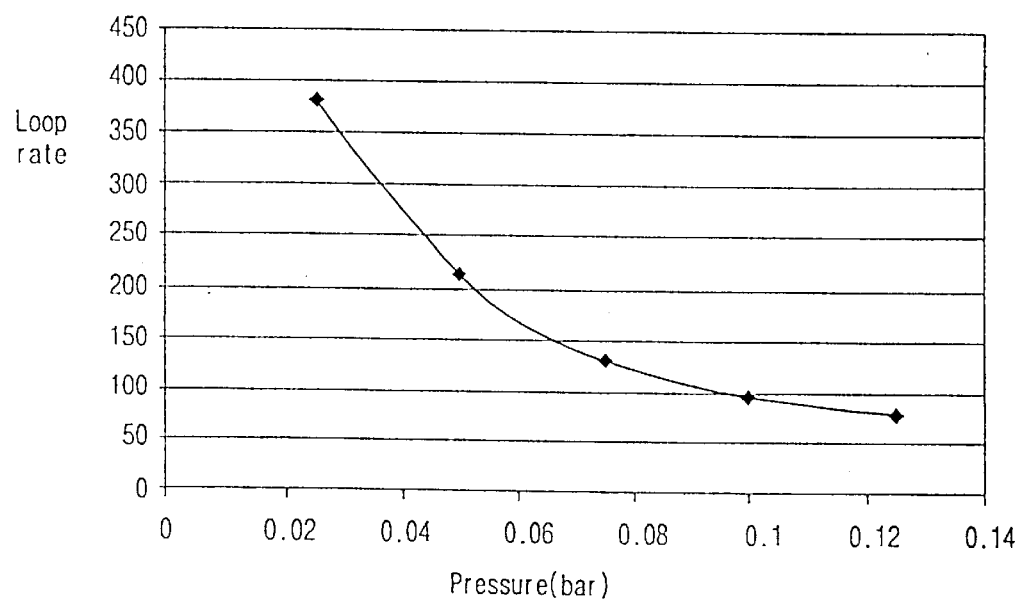
FIG. 18A shows the relationship between the loop rate and the fill pressure in the MFC of FIG. 14A, with the opening level of the main valve fixed.

A variety of different fill pressures were tested to determine the most suitable flow rates envisaged. The main valve was set and different fill pressures entered into the test program. As shown in FIG. 18A, the loop rates for a steady flow rate were 375 loops/min for a fill pressure of 0.025 Bar and 75 loops/min for 0.125 Bar. The greater the fill pressure was, the lesser were the number of loops for the same flow rate.

Figure 18B:
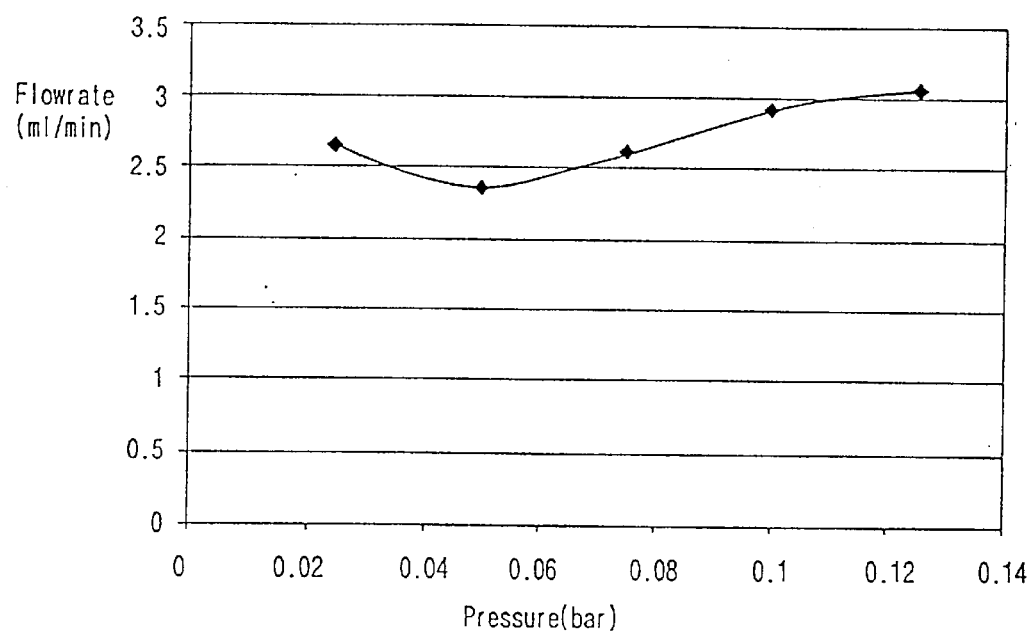
FIG. 18B shows the flow rate measured with respect to different fill pressures in the MFC of FIG. 14A, with the opening level of the main valve fixed.

FIG. 18B shows the flow rate measured with respect to different fill pressures with the opening level of the main valve 11 fixed. As shown, the flow rate increased as the fill pressure went up, although the flow rate through the main valve 11 had been set constant. As known from the bowl shaped curve of FIG. 18B, the pressure in the reservoir 1 easily exceeded the required fill pressure and it caused the overcharging, at too low a pressure (for example, 0.025 Bar fill pressure in FIG. 18B). Therefore, the system designer should consider this point in choosing the fill pressure of the system. According to the experimental condition in FIG. 18B, 0.05 Bar as a usable fill pressure and 0.002 Bar as a usable empty pressure could be chosen.

Figure 19:
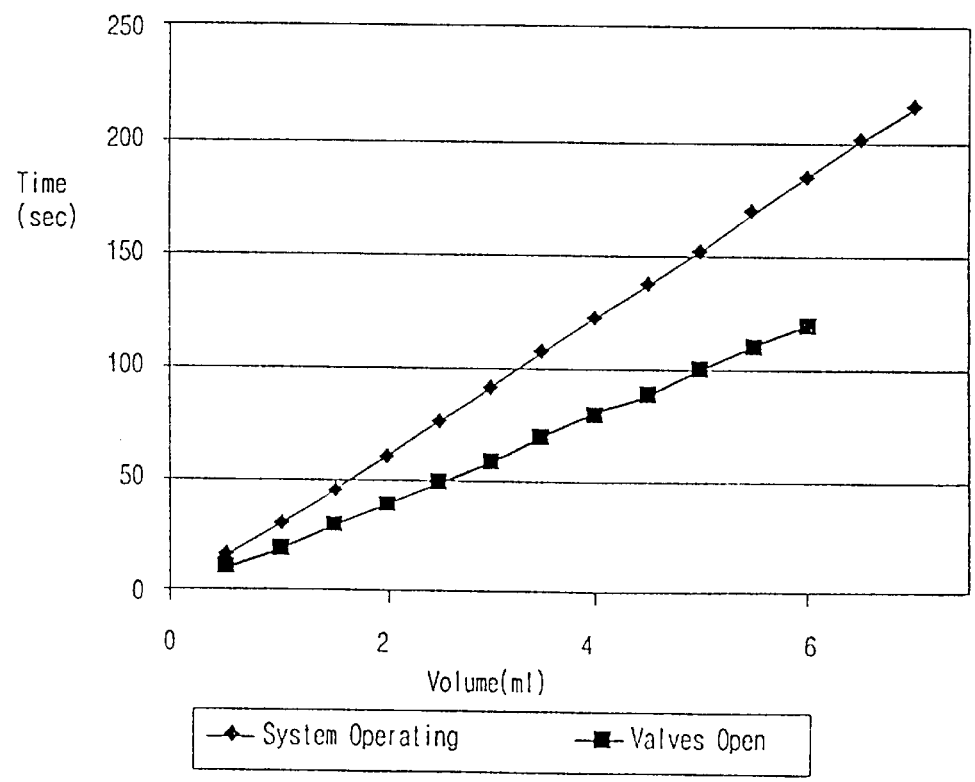
FIG. 19 shows the relationship between the time and the volume under the normal operation state of the system and the state in which both the inlet valve and outlet valve are left open in the MFC of FIG. 14A.

FIG. 19 shows the relationship between the time and the volume under the normal operation state of the system and the state in which both the inlet valve 13 and the outlet valve 3 are left open, in the MFC of FIG. 14A.

As shown, the experimental result shows that the flow rate passing through the reservoir 1 under the normal operation state of the system in which charging and discharging are repeated, was relatively smaller than that under the state in which both the inlet valve 13 and outlet valve 3 were left permanently open. These observations were due to the pressure losses and pressure leakage. In the state in which both inlet valve 13 and outlet valve 3 were left permanently open, the supply pressure had to push through the air and the leakage became disproportionately large.

What is claimed is:

1. A time based mass flow controller comprising:
   at least one reservoir;
   at least one inlet valve, each inlet valve opening/closing an inlet of each corresponding reservoir;
   at least one outlet valve, each outlet valve opening/closing an outlet of each corresponding reservoir;
   at least one pressure sensor, each pressure sensor detecting the gas pressure in each corresponding reservoir; and
   a controller for controlling the number of opening/closing loops of the inlet valve and the outlet valve per unit time and/or mass/volume of a gas stored and discharged at the reservoir per unit opening/closing loop of the inlet valve and the outlet valve, with the inlet valve opening the inlet of the reservoir to allow the gas to flow into the reservoir when the outlet valve is in a closed state, and thereafter the outlet valve opening the outlet of the reservoir to allow the gas to flow out from the reservoir when the inlet valve is in a closed state, so that the controller may control the mass/volume flow rate of the outflow gas from the reservoir.

2. The time based mass flow controller as claimed in claim 1, further comprising a regulator on an upstream side of the inlet of the reservoir, the regulator regulating the gas pressure of an inflow gas into the reservoir to be constant.

3. The time based mass flow controller as claimed in claims 1, further comprising a temperature sensor for measuring the gas temperature in the reservoir, wherein the controller controls the number of opening/closing loops of the inlet valve and the outlet valve per unit time and/or mass/volume of gas stored and discharged at the reservoir per unit opening/closing loop of the inlet valve and the outlet valve, based on the gas temperature in the reservoir measured by the temperature sensor, so that the controller may control the mass/volume flow rate of the outflow gas from the reservoir.

4. The time based mass flow controller as claimed in claim 1, further comprising a buffer installed on a downstream side of the outlet of the reservoir, the buffer having a larger volume than the reservoir.

5. The time based mass flow controller as claimed in claim 4, wherein the buffer has a variable volume, the volume being varied so that the perturbation in the mass/volume flow rate of the outflow gas from the buffer may be minimized.

6. The time based mass flow controller as claimed in claim 5, wherein the buffer has a spring means, the spring means acting against the gas pressure in the buffer.

7. The time based mass flow controller as claimed in claim 1, wherein more than one reservoir is installed in parallel, each of the inlet valves and the outlet valves of the respective reservoirs having different opening/closing points in time.

8. The time based mass flow controller as claimed in claim 7, wherein more than one regulator is installed in parallel, each regulator being installed on an upstream side of the inlet of each corresponding reservoir and regulating the gas pressure of an inflow gas into each corresponding reservoir to be constant.

9. The time based mass flow controller as claimed in claim 7, wherein more than one buffer is installed in parallel, each buffer being installed on a downstream side of the outlet of each corresponding reservoir and having a larger volume than each corresponding reservoir.

10. The time based mass flow controller as claimed in claim 1, wherein the controller controls the inlet valve to open the inlet of the reservoir when the reservoir is in a state of a reference empty pressure and to close the inlet of the reservoir when the reservoir is in a state of a reference fill pressure, and the controller controls the outlet valve to close the outlet of the reservoir when the reservoir is in a state of the reference empty pressure and to open the outlet of the reservoir when the reservoir is in a state of the reference fill pressure.

11. The time based mass flow controller as claimed in claim 10, further comprising a regulator on an upstream side of the inlet of the reservoir, the regulator regulating the gas pressure of an inflow gas into the reservoir to be constant.

12. The time based mass flow controller as claimed in claim 10, further comprising a temperature sensor for measuring the gas temperature in the reservoir, wherein the controller controls the number of opening/closing loops of the inlet valve and the outlet valve per unit time and/or mass/volume of gas stored and discharged at the reservoir per unit opening/closing loop of the inlet valve and the outlet valve, based on the gas temperature in the reservoir measured by the temperature sensor, so that the controller may control the mass/volume flow rate of the outflow gas from the reservoir.

13. The time based mass flow controller as claimed in claim 10, further comprising a buffer installed on a downstream side of the outlet of the reservoir, the buffer having a larger volume than the reservoir.

14. The time based mass flow controller as claimed in claim 13, wherein the buffer has a variable volume, the volume being varied so that the perturbation in the mass/volume flow rate of the outflow gas from the buffer may be minimized.

15. The time based mass flow controller as claimed in claim 14, wherein the buffer has a spring means, the spring means acting against the gas pressured in the buffer.

16. The time based mass flow controller as claimed in claim 10, wherein more than one reservoir is installed in parallel, each of the inlet valves and the outlet valves of the respective reservoirs having different opening/closing points in time.

17. The time based mass flow controller as claimed in claim 16, wherein more than one regulator is installed in parallel, each regulator being installed on an upstream side of the inlet of each corresponding reservoir and regulating the gas pressure of an inflow gas into each corresponding reservoir to be constant.

18. The time based mass flow controller as claimed in claim 16, wherein more than one buffer is installed in parallel, each buffer being installed on a downstream side of the outlet of each corresponding reservoir and having a larger volume than each corresponding reservoir.

19. The time based mass flow controller as claimed in claim 10, wherein the controller controls a time period from an opening of the inlet of the reservoir to a closing of the inlet of the reservoir and/or from a closing of the outlet of the reservoir to an opening of the outlet of the reservoir, so that the controller may control the mass/volume flow rate of the outflow gas from the reservoir.

20. The time based mass flow controller as claimed in claim 19, further comprising a regulator on an upstream side of the inlet of the reservoir, the regulator regulating the gas pressure of an inflow gas into the reservoir to be constant.

21. The time based mass flow controller as claimed in claim 19, further comprising a temperature sensor for measuring the gas temperature in the reservoir, wherein the controller controls the number of opening/closing loops of the inlet valve and the outlet valve per unit time and/or mass/volume of gas stored and discharged at the reservoir per unit opening/closing loop of the inlet valve and the outlet valve, based on the gas temperature in the reservoir measured by the temperature sensor, so that the controller may control the mass/volume flow rate of the outflow gas from the reservoir.

22. The time based mass flow controller as claimed in claim 19, further comprising a buffer installed on a downstream side of the outlet of the reservoir, the buffer having a larger volume than the reservoir.

23. The time based mass flow controller as claimed in claim 22, wherein the buffer has a variable volume, the volume being varied so that the perturbation in the mass/volume flow rate of the outflow gas from the buffer may be minimized.

24. The time based mass flow controller as claimed in claim 23, wherein the buffer has a spring means, the spring means acting against the gas pressure in the buffer.

25. The time based mass flow controller as claimed in claim 19, wherein more than one reservoir is installed in parallel, each of the inlet valves and the outlet valves of the respective reservoirs having different opening/closing points in time.

26. The time based mass flow controller as claimed in claim 25, wherein more than one regulator is installed in parallel, each regulator being installed on an upstream side of the inlet of each corresponding reservoir and regulating the gas pressure of an inflow gas into each corresponding reservoir to be constant.

27. The time based mass flow controller as claimed in claim 25, wherein more than one buffer is installed in parallel, each buffer being installed on a downstream side of the outlet of each corresponding reservoir and having a larger volume than each corresponding reservoir.

28. The time based mass flow controller as claimed in claim 1, wherein a time delay is provided between a closing of the inlet valve and an opening of the outlet valve and/or between a closing of the outlet valve and an opening of the inlet valve, and the controller controls the length of the time delay, so that the controller may control the mass/volume flow rate of the outflow gas from the reservoir.

29. The time based mass flow controller as claimed in claim 28, further comprising a regulator on an upstream side of the inlet of the reservoir, the regulator regulating the gas pressure of an inflow gas into the reservoir to be constant.

30. The time based mass flow controller as claimed in claim 28, further comprising a temperature sensor for measuring the gas temperature in the reservoir, wherein the controller controls the number of opening/closing loops of the inlet valve and the outlet valve per unit time and/or mass/volume of gas stored and discharged at the reservoir per unit opening/closing loop of the inlet valve and the outlet valve, based on the gas temperature in the reservoir measured by the temperature sensor, so that the controller may control the mass/volume flow rate of the outflow gas from the reservoir.

31. The time based mass flow controller as claimed in claims 28, further comprising a buffer installed on a downstream side of the outlet of the reservoir, the buffer having a larger volume than the reservoir.

32. The time based mass flow controller as claimed in claim 31, wherein the buffer has a variable volume, the volume being varied so that the perturbation in the mass/volume flow rate of the outflow gas from the buffer may be minimized.

33. The time based mass flow controller as claimed in claim 32, wherein the buffer has a spring means, the spring means acting against the gas pressure in the buffer.

34. The time based mass flow controller as claimed in claim 28, wherein more than one reservoir is installed in parallel, each of the inlet valves and the outlet valves of the respective reservoirs having different opening/closing points in time.

35. The time based mass flow controller as claimed in claim 34, wherein more than one regulator is installed in parallel, each regulator being installed on an upstream side of the inlet of each corresponding reservoir and regulating the gas pressure of an inflow gas into each corresponding reservoir to be constant.

36. The time based mass flow controller as claimed in claim 34, wherein more than one buffer is installed in parallel, each buffer being installed on a downstream side of the outlet of each corresponding reservoir and having a larger volume than each corresponding reservoir.

37. The time based mass flow controller as claimed in claim 1, wherein the reservoir is a volume-variable storage chamber and the controller controls the volume of the reservoir.

38. The time based mass flow controller as claimed in claim 37, further comprising a regulator on an upstream side of the inlet of the reservoir, the regulator regulating the gas pressure of an inflow gas into the reservoir to be constant.

39. The time based mass flow controller as claimed in claim 37, further comprising a temperature sensor for measuring the gas temperature in the reservoir, wherein the controller controls the number of opening/closing loops of the inlet valve and the outlet valve per unit time and/or mass/volume of gas stored and discharged at the reservoir per unit opening/closing loop of the inlet valve and the outlet valve, based on the gas temperature in the reservoir measured by the temperature sensor, so that the controller may control the mass/volume flow rate of the outflow gas from the reservoir.

40. The time based mass flow controller as claimed in claim 37, further comprising a buffer installed on a downstream side of the outlet of the reservoir, the buffer having a larger volume than the reservoir.

41. The time based mass flow controller as claimed in claim 40, wherein the buffer has a variable volume, the volume being varied so that the perturbation in the mass/volume flow rate of the outflow gas from the buffer may be minimized.

42. The time based mass flow controller as claimed in claim 41, wherein the buffer has a spring means, the spring means acting against the gas pressure in the buffer.

43. The time based mass flow controller as claimed in claim 37, wherein more than one reservoir is installed in parallel, each of the inlet valves and the outlet valves of the respective reservoirs having different opening/closing points in time.

44. The time based mass flow controller as claimed in claim 43, wherein more than one regulator is installed in parallel, each regulator being installed on an upstream side of the inlet of each corresponding reservoir and regulating the gas pressure of an inflow gas into each corresponding reservoir to be constant.

45. The time based mass flow controller as claimed in claim 43, wherein more than one buffer is installed in parallel, each buffer being installed on a downstream side of the outlet of each corresponding reservoir and having a larger volume than each corresponding reservoir.

46. A method for controlling mass/volume flow rate using a time based mass flow controller, the time based mass flow controller comprising at least one reservoir, at least one inlet valve, each inlet valve opening/closing an inlet of each corresponding reservoir, at least one outlet valve, each outlet valve opening/closing an outlet of each corresponding reservoir, and at least one pressure sensor, each pressure sensor detecting the gas pressure in each corresponding reservoir, the method comprising the steps of:

controlling the number of opening/closing loops of the inlet valve and the outlet valve per unit time and/or mass/volume of a gas stored and discharged at the reservoir per unit opening/closing loop of the inlet valve and the outlet valve, with the inlet valve opening the inlet of the reservoir to allow the gas to flow into the reservoir when the outlet valve is in a closed state, and thereafter the outlet valve opening the outlet of the reservoir to allow the gas to flow from the reservoir when the inlet valve is in a closed state, so as to control the mass/volume flow rate of the outflow gas from the reservoir.

* * * * *